United States Patent
Ling et al.

(10) Patent No.: US 7,127,688 B2
(45) Date of Patent: Oct. 24, 2006

(54) METHOD AND APPARATUS FOR DETERMINING INTERACTIVE ELECTROMAGNETIC EFFECTS AMONG CONDUCTORS OF A MULTI-LAYER CIRCUIT

(75) Inventors: Feng Ling, Gilbert, AZ (US); Vladimir I. Okhmatovski, Phoenix, AZ (US); Enis Aykut Dengi, Tempe, AZ (US)

(73) Assignee: Cadence Design Systems, Inc., San Jose, CA (US)

( * ) Notice: Subject to any disclaimer, the term of this patent is extended or adjusted under 35 U.S.C. 154(b) by 266 days.

(21) Appl. No.: 10/837,293

(22) Filed: Apr. 30, 2004

(65) Prior Publication Data

US 2005/0076317 A1  Apr. 7, 2005

Related U.S. Application Data

(60) Provisional application No. 60/508,819, filed on Oct. 3, 2003.

(51) Int. Cl.
*G06F 17/50* (2006.01)
*G06F 19/00* (2006.01)
*G01R 19/00* (2006.01)

(52) U.S. Cl. .................. 716/4; 703/2; 703/16; 702/64
(58) Field of Classification Search .............. 716/4; 703/2, 16; 702/64
See application file for complete search history.

(56) References Cited

U.S. PATENT DOCUMENTS

| | | | | |
|---|---|---|---|---|
| 3,904,886 | A * | 9/1975 | Ehling et al. ............... | 307/69 |
| 4,786,971 | A * | 11/1988 | Kaneko et al. ............ | 348/231.7 |
| 6,064,808 | A | 5/2000 | Kapur et al. | |
| 6,353,801 | B1 * | 3/2002 | Sercu et al. ............... | 702/65 |
| 6,920,403 | B1 * | 7/2005 | Ootouge .................... | 702/60 |
| 7,013,436 | B1 * | 3/2006 | Morton et al. ............. | 716/1 |
| 2003/0106030 | A1 * | 6/2003 | Keller et al. .............. | 716/4 |

OTHER PUBLICATIONS

Chen et al., "Model and Design of PCB Parallel Winding For Planar Transformer", IEEE Transactions on Magnetics, vol. 39, No. 5, Part 2, Sep. 2003, pp. 3202-3204.*

Feng Ling, Chao-Fu Wang, and Jian-Ming Jin, "An Efficient Algorithm For Analyzing Large-Scale Microstrip Structures Using Adaptive Integral Method Combined With Discrete Complex-Image Method", IEEE Transactions On Microwave Theory And Techniques, vol. 48, No. 5, pp. 832-839, (May 2000).

E. Bleszynski, M. Bleszynski and T. Jaroszewicz, "AIM: Adaptive Integral Method For Solving Large-Scale Electromagnetic Scattering And Radiation Problems", Radio Science, vol. 31, No. 5, pp. 1225-1251, (Sep.-Oct. 1996).

(Continued)

*Primary Examiner*—Phallaka Kik
(74) *Attorney, Agent, or Firm*—Morrison & Foerster LLP

(57) ABSTRACT

To estimate a distribution of voltages or currents in the layers of a multi-layer circuit, an exemplary current flow in each layer is discretized into a number of current vector elements and at least one scalar charge element related to the charge associated with each current vector element. A first distribution of voltages induced in each circuit layer is determined from current vector elements in all of the circuit layers. A second distribution of voltages induced in each circuit layer is determined from the scalar charge elements in all of the circuit layers. For each circuit layer, the first and second distributions of voltages induced therein are combined to determine an actual distribution of voltages in the circuit layer.

38 Claims, 10 Drawing Sheets

OTHER PUBLICATIONS

Joel R. Phillips and Jacob K. White, "A Precorrected-FFT Method For Electrostatic Analysis Of Complicated 3-D Structures", IEEE Transactions On Computer-Aided Design Of Integrated Circuits And Systems, vol. 16, No. 10, pp. 1059-1072, (Oct. 1997).

* cited by examiner

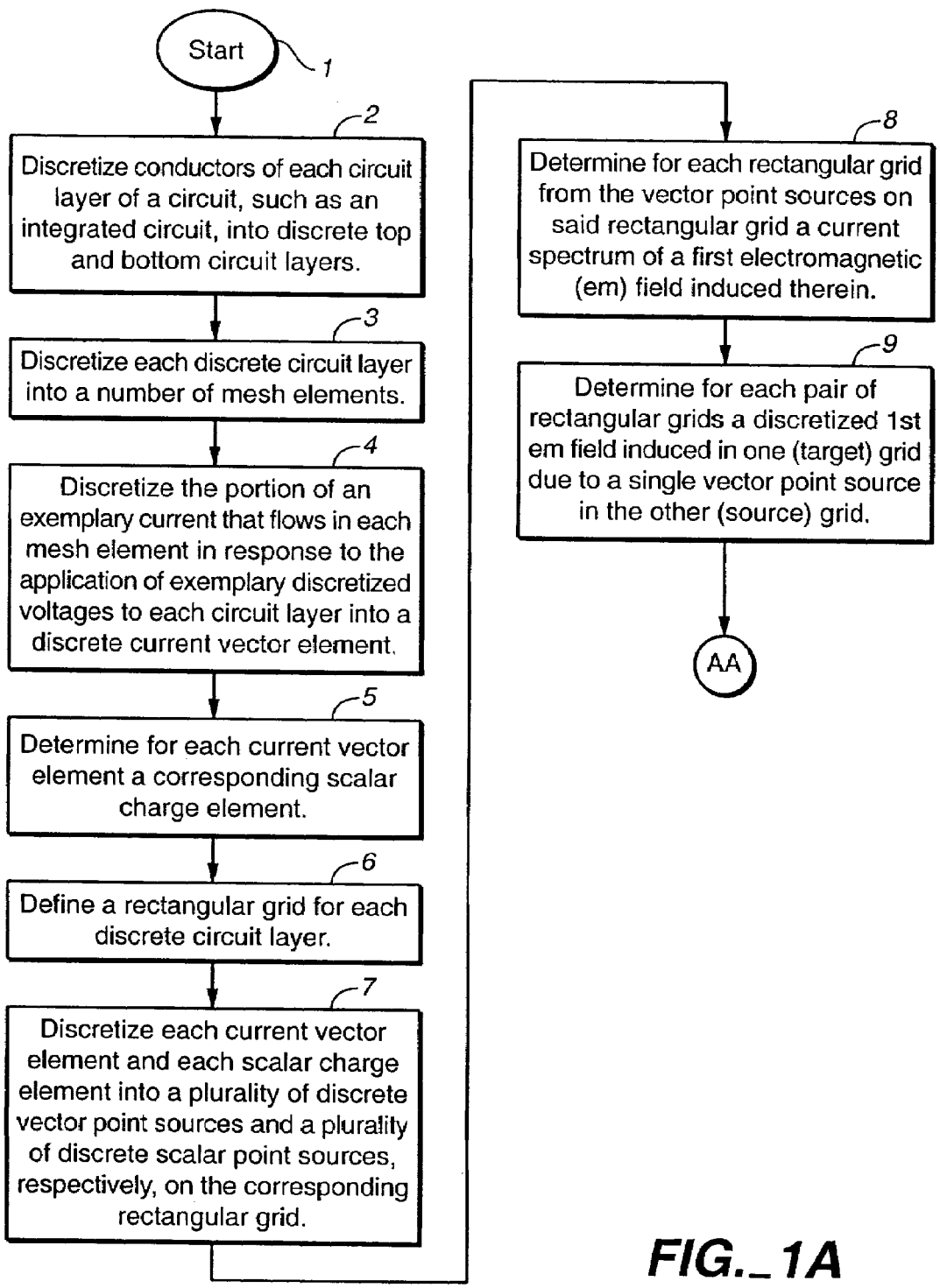
FIG._1A

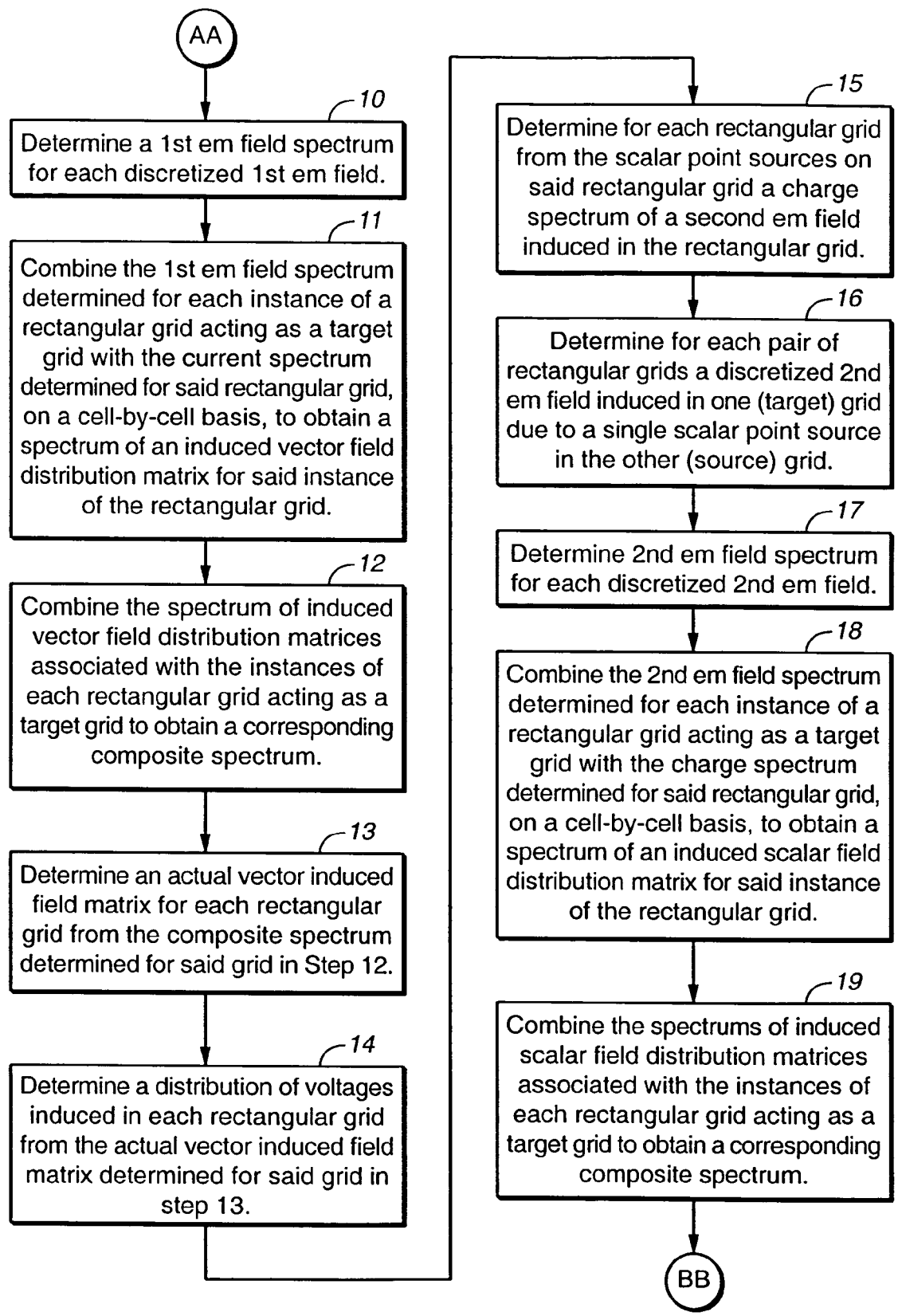
FIG._1B

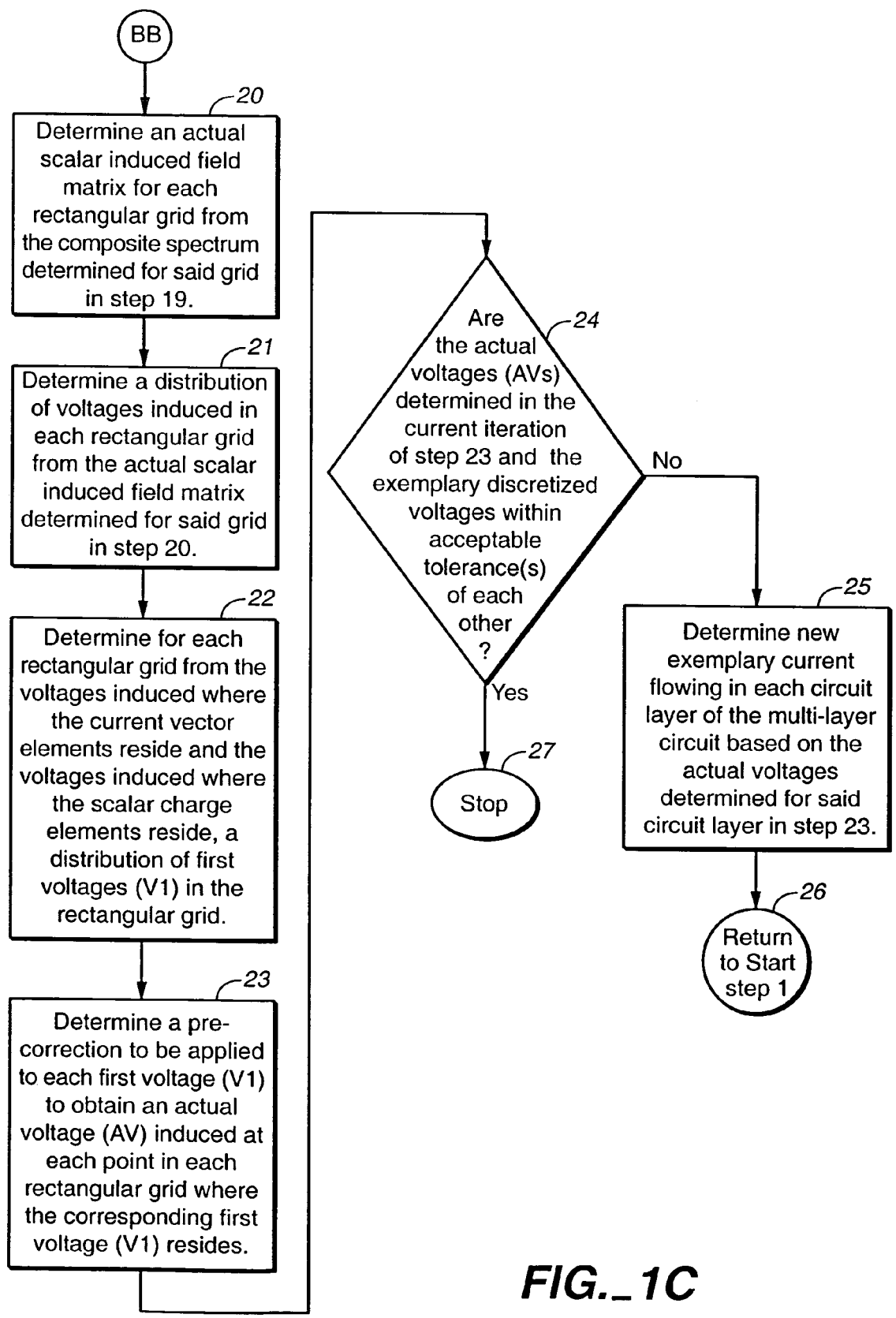
FIG._1C

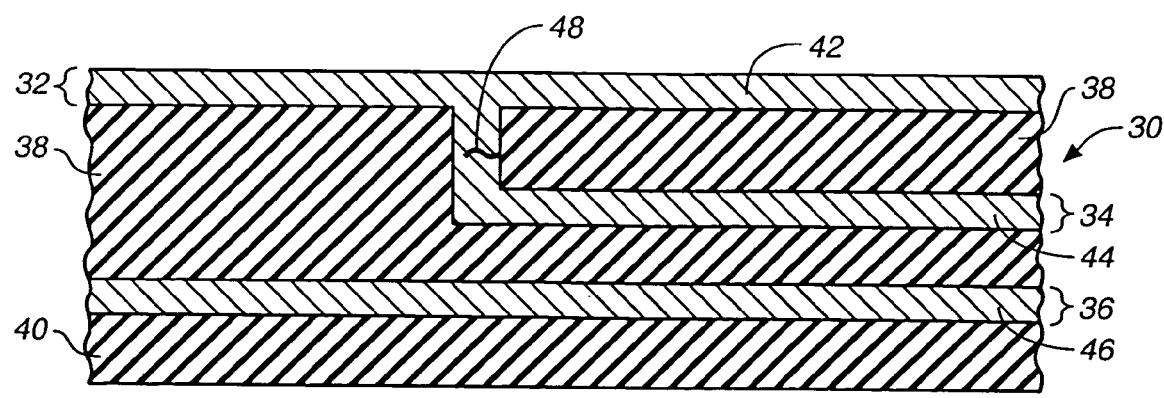
FIG._2
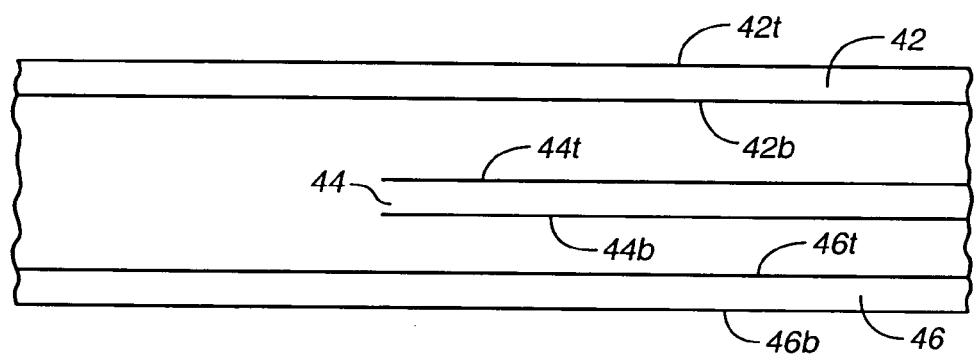
FIG._3

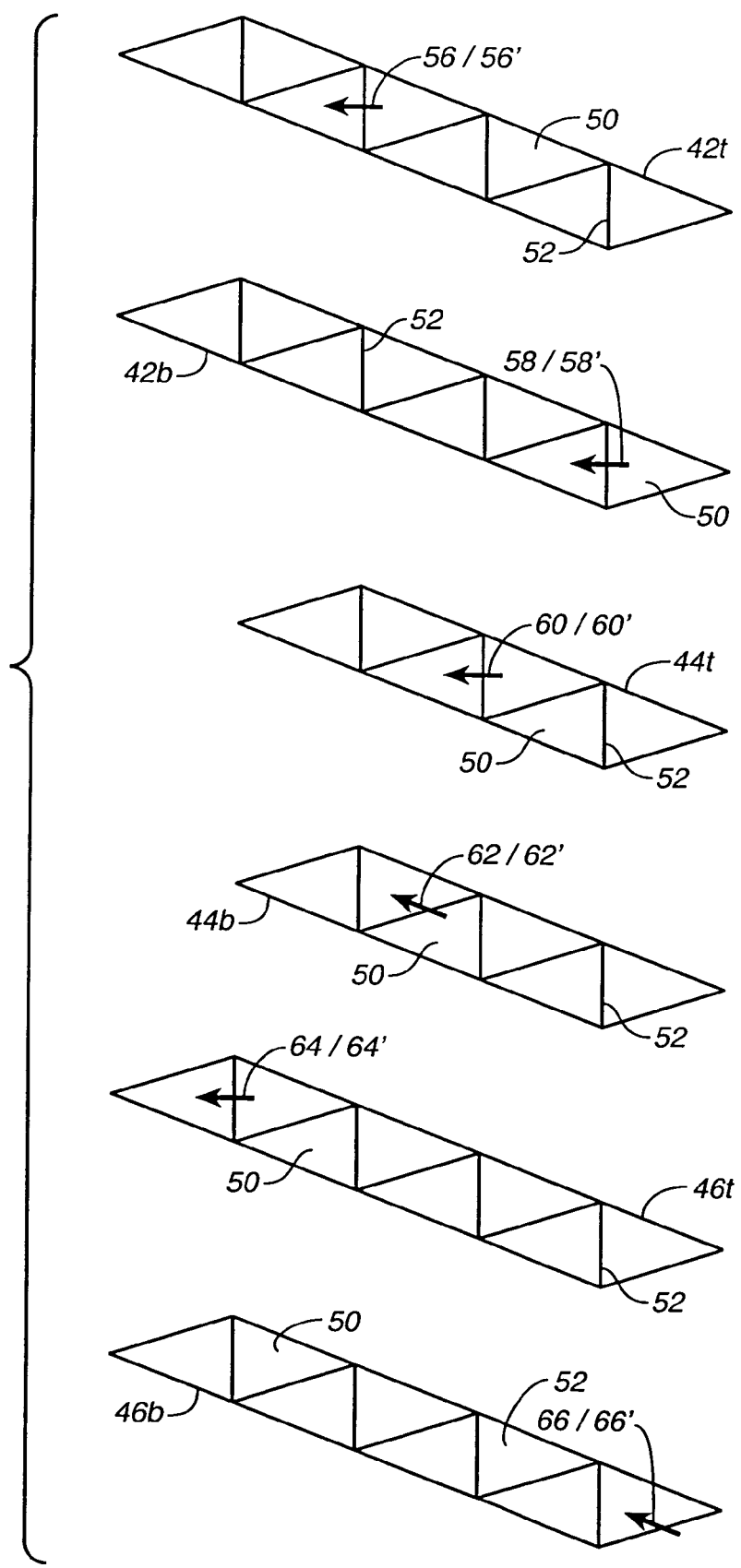
FIG._4

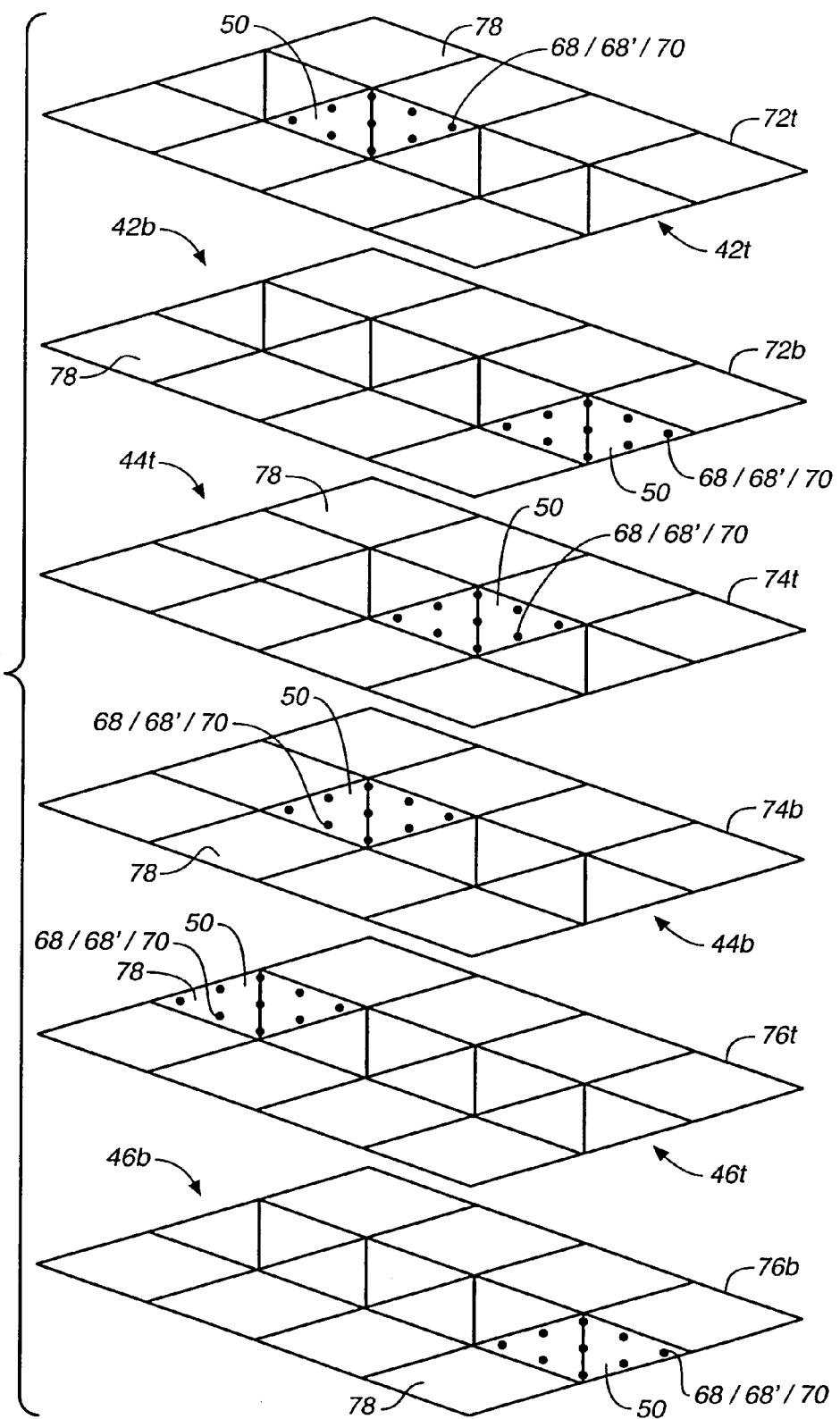
FIG._5

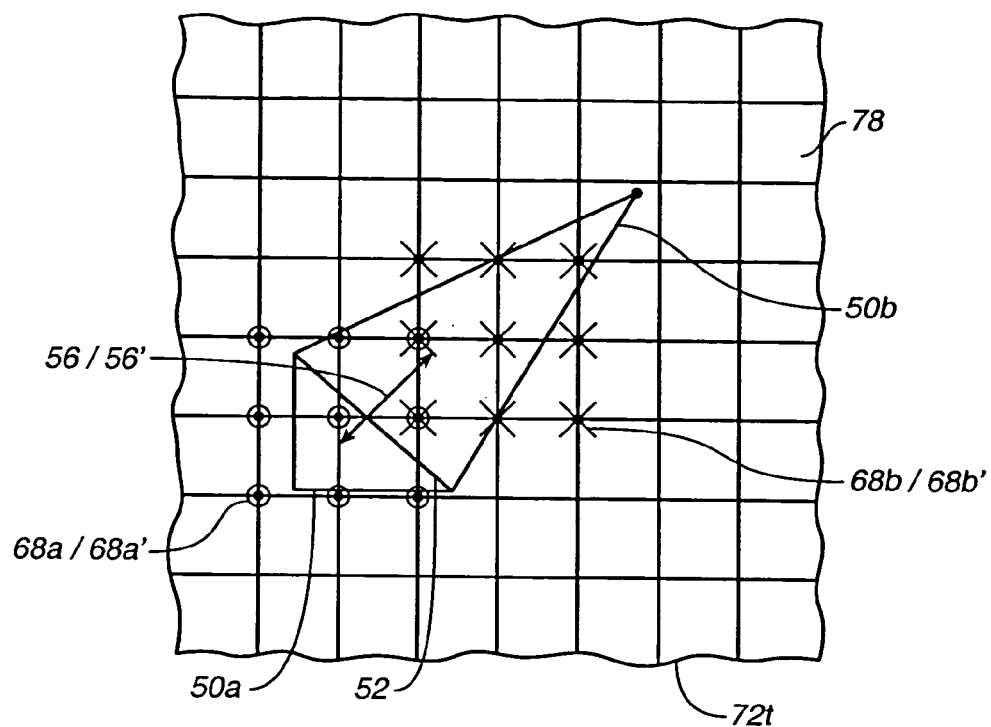
FIG._6A
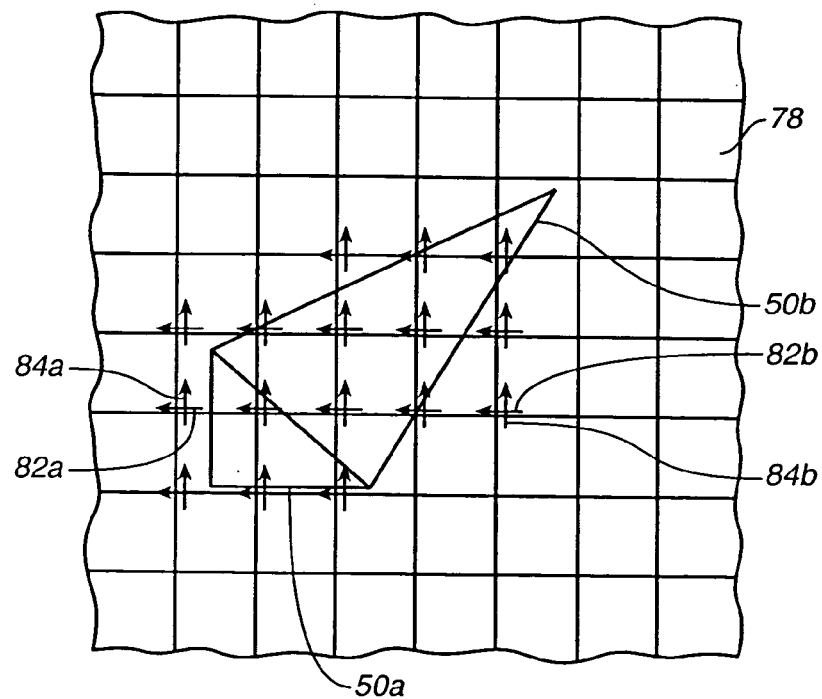
FIG._6B

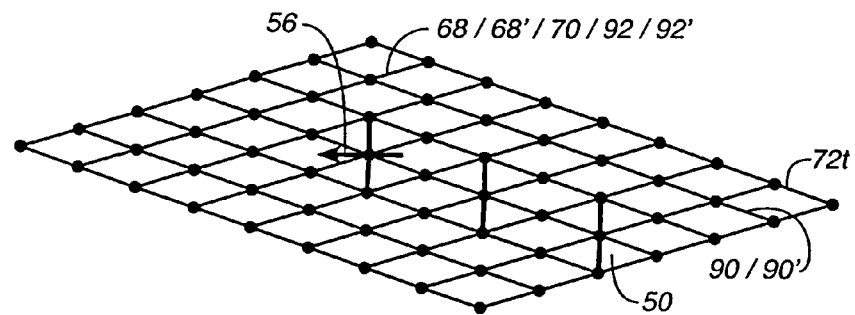
FIG._7
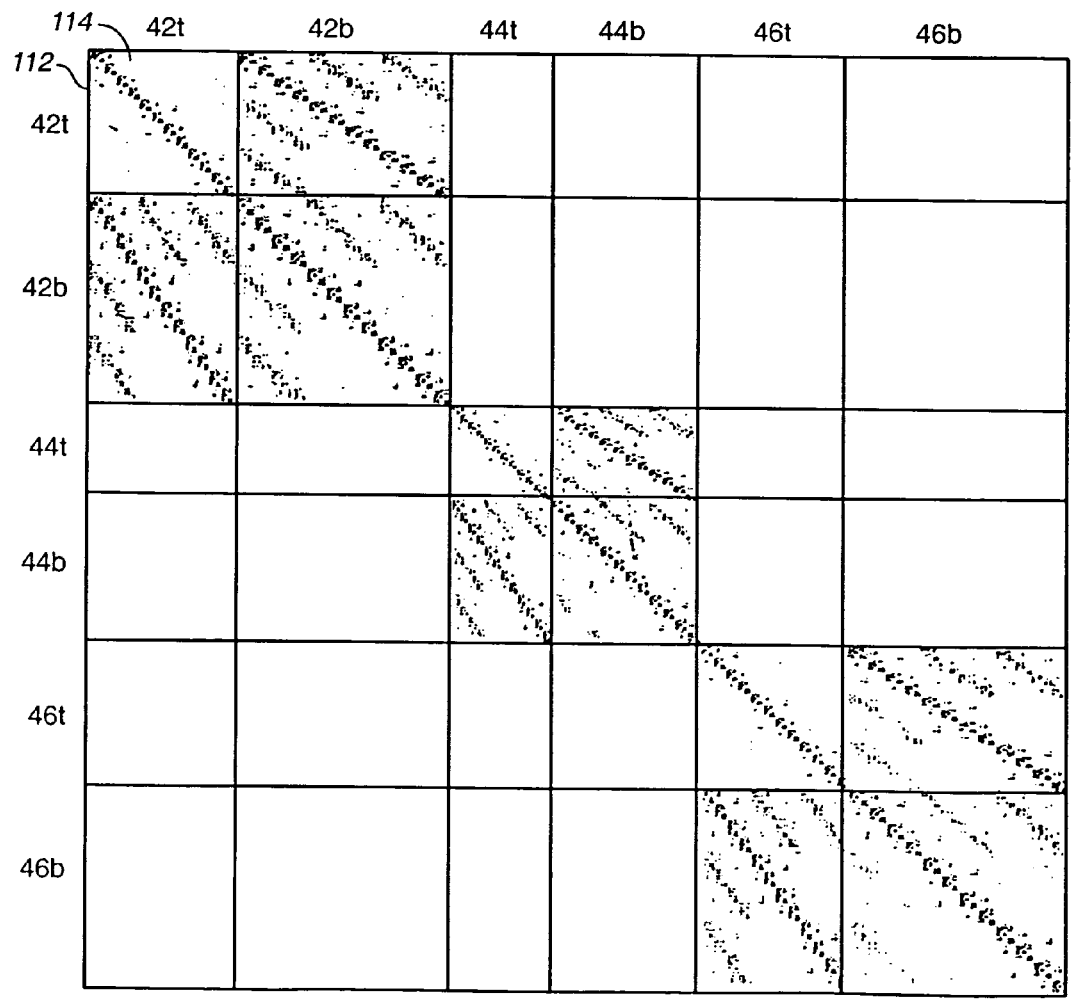
FIG._8

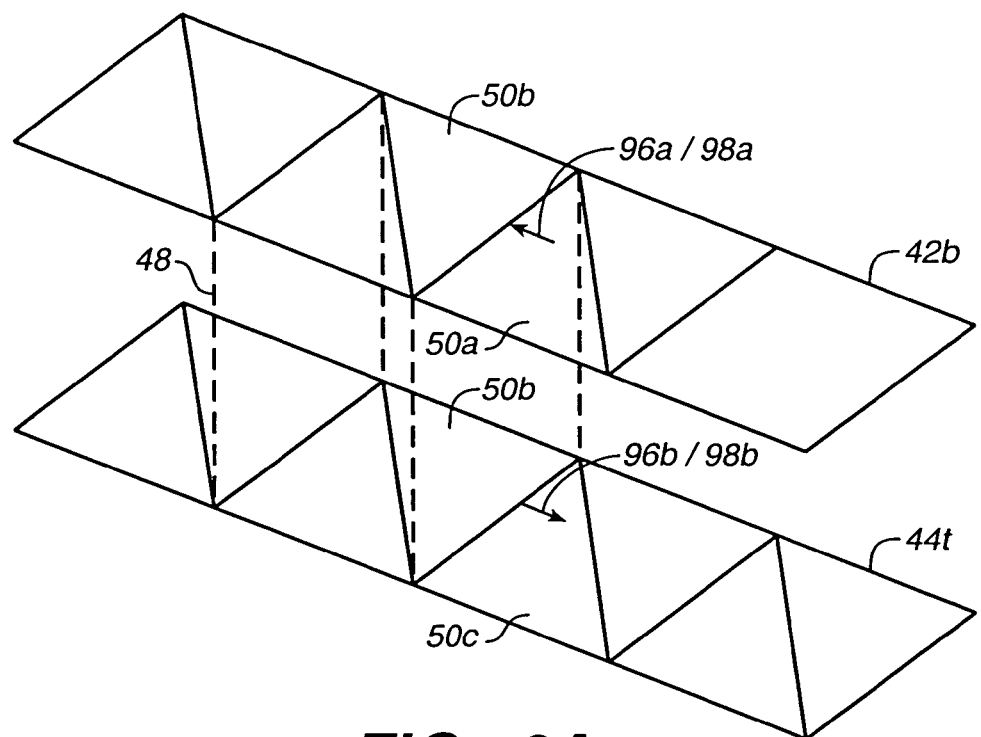
FIG._9A
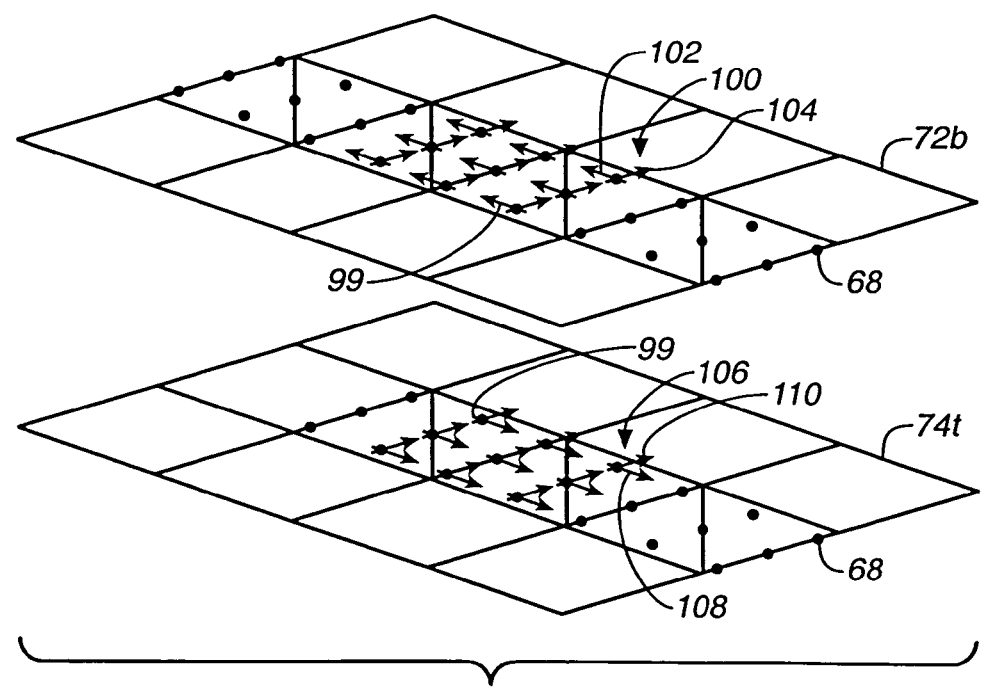
FIG._9B

METHOD AND APPARATUS FOR DETERMINING INTERACTIVE ELECTROMAGNETIC EFFECTS AMONG CONDUCTORS OF A MULTI-LAYER CIRCUIT

CROSS REFERENCE TO RELATED APPLICATIONS

This application claims priority from U.S. Provisional Patent Application No. 60/508,819, filed Oct. 3, 2003.

GOVERNMENT INTERESTS

The United States has a paid-up license in this invention and the right in limited circumstances to require the patent owner to license others on reasonable terms as provided for by the terms of TIA F33615-01-2-1970 awarded by the Defense Advanced Research Projects Agency.

BACKGROUND OF THE INVENTION

1. Field of the Invention

The present invention relates to the design of multi-layer circuits, e.g., integrated circuits or printed circuits, and, more particularly, to determining the electromagnetic effects on the performance of the circuit from a bias applied to the multi-layer circuit.

2. Description of Related Art

As the size of electrical devices and interconnecting conductors of multi-layer circuits, especially multi-layer integrated circuits, continues to decrease and the bandwidth of operation continues to increase, the effects on the performance of the circuit due to electromagnetic effects in the various layers of the circuit have become more pronounced.

Heretofore, analysis of such effect on each circuit layer was limited to evaluating such effect due to current flowing only in the layer itself. See for example, "*An Efficient Algorithm For Analyzing Large-Scale Microstrip Structures Using Adaptive Integral Method Combined With Discrete Complex-Image Method*", by Ling et al., IEEE Transactions On Microwave Theory And Techniques, Vol. 48, No. 5, pp. 832–839, (May 2000); "*AIM: Adaptive Integral Method For Solving Large-Scale Electromagnetic Scattering And Radiation Problems*", by Bleszynski et al., Radio Science, Volume 31, Number 5, Pages 1225–1251, (September–October 1996); and "*A Precorrected-FFT Method For Electrostatic Analysis Of Complicated 3-D Structures*", by Phillips et al., IEEE Transactions On Computer-Aided Design Of Integrated Circuits And Systems, Vol. 16, No. 10, pp. 1059–1072, (October 1997).

While this approach has been applied successfully in the past, the increasing density of devices and the reduction in size of interconnecting conductors in the design of multi-layer circuits require that the effects on the performance of the circuit due to the cumulative effects of currents flowing in all of the layers of the circuit be considered.

What is needed, however, and not disclosed in the prior art is a method and apparatus for determining the effects on the performance of a multi-layer circuit, such as an integrated circuit or a multi-layer printed circuit board, due to currents flowing in all of the layers of the circuit in a computationally efficient and time-effective manner. It is also desirable that such method and apparatus have a predictable degree of accuracy.

SUMMARY OF THE INVENTION

The invention is a method of determining a distribution of voltages or currents in a plurality of layers of a multi-layer circuit design in response to energization of the circuit design with an exemplary bias. The method includes (a) discretizing an exemplary current that flows in each layer of a multi-layer circuit design in response to the application of an exemplary bias to the circuit design into a plurality of current vector elements on said layer; (b) determining for each current vector element on each layer at least one corresponding scalar charge element on said layer; (c) determining for each layer from the current vector elements on the plurality of layers a spectrum of a first electromagnetic (em) field induced in the layer; (d) determining a first distribution of voltages induced in each layer from the spectrum of the first electromagnetic (em) field induced in said layer; (e) determining for each layer from the scalar charge elements on the plurality of layers a spectrum of a second em field induced in the layer; (f) determining a second distribution of voltages induced in each circuit layer from the spectrum of the second em field induced in for said layer; and (g) determining for each layer from the first and second distributions of voltages induced in the layer a distribution of voltages in the layer.

Step (c) can include determining a current spectrum for each layer from the plurality of current vector elements on said layer; determining for each pair of layers a distribution of a first em field induced in one of said pair of layers (target layer) in response to the effect of at least one current vector element on the other of said pair of layers (source layer), wherein each layer acting as both the target layer and the source layer comprises one of said pair of layers; determining for each first em field distribution a corresponding first em field spectrum; for each instance where each layer is the target layer of a pair of layers, combining the current spectrum determined for said layer with the first em field spectrum determined for said instance of said layer to obtain a spectrum of an induced vector field distribution matrix for said instance of said layer; and for instances where each layer is the target layer of a pair of layers, combining the spectrums of the induced vector field distribution matrices associated with said instances to obtain the spectrum of the first em field induced in said layer.

Step (e) can include determining a charge spectrum for each layer from the plurality of scalar charges on said layer; determining for each pair of layers a distribution of a second em field induced in one of said pair of layers (target layer) in response to the effect of at least one scalar charge element on the other of said pair of layers (source layer), wherein each layer acting as both the target layer and the source layer comprises one of said pair of layers; determining for each second em field distribution a corresponding second em field spectrum; for each instance where each layer is the target layer of a pair of layers, combining the charge spectrum determined for said layer with the second em field spectrum determined for said instance of said layer to obtain a spectrum of an induced scalar field distribution matrix for said instance of said layer; and for instances where each layer is the target layer of a pair of layers, combining the spectrums of the induced scalar field distribution matrices associated with said instances to obtain the second spectrum of the em field induced in said layer.

The method can further include discretizing each layer into a plurality of discrete layers and performing steps (a)–(g) for each discrete layer.

The invention is also a method of determining a distribution of voltages or currents in a multi-layer circuit design in response to energization of the circuit design with an exemplary bias. The method includes (a) defining top and bottom layers for each conductor in each level of a multi-layer circuit design; (b) discretizing an exemplary current that flows in each layer in response to the application of an exemplary bias to the circuit design into a plurality of current vector elements on said layer; (c) determining for each current vector element on each layer at least one scalar charge element on said layer related to a derivative of said current vector element; (d) determining a current spectrum for each layer from the current vector elements on said layer; (e) determining for each pair of layers a distribution of a first electromagnetic (em) field induced in the one of said pair of layers (target layer) due to the effect of at least one current vector element in the other of said pair of layers (source layer), wherein the pairs of layers include: each layer acting as both the target layer and the source layer, and each layer acting as the target layer for each other layer, one-at-a-time, acting as the source layer; (f) determining a first em field spectrum for each instance of the first em field distribution; (g) for each instance where each layer is the target layer of a pair of layers, combining the current spectrum determined for said layer in step (d) with the first em field spectrum determined for said instance of said layer in step (f) to obtain therefor a spectrum of an induced vector field distribution matrix; (h) for instances where each layer is the target layer of a pair of layers, combining the spectrums of the induced vector field distribution matrices associated with said instances to obtain for said layer a corresponding composite spectrum of induced vector field distribution matrices; (i) determining from the composite spectrum of induced vector field distribution matrices for each layer a corresponding actual vector induced field matrix; (j) determining a first distribution of voltages in each layer from the actual vector induced field matrix for said layer; (k) determining a charge spectrum for each layer from the scalar charge elements determined on said layer; (l) determining for each pair of layers a distribution of a second electromagnetic (em) field induced in one of said pair of layers (target layer) due to the effect of at least one scalar charge element in the other of said pair of layers (source layer), wherein the pairs of layers include: each layer acting as both the target layer and the source layer, and each layer acting as the target layer for each other layer, one-at-a-time, acting as the source layer; (m) determining a second em field spectrum for each instance of the second em field distribution; (n) for each instance where each layer is the target layer of a pair of layers, combining the charge spectrum determined for said layer in step (k) with the second em field spectrum determined for said instance of said layer in step (m) to obtain therefor a spectrum of an induced scalar field distribution matrix; (o) for instances where each layer is the target layer of a pair of layers, combining the spectrums of the induced scalar field distribution matrices associated with said instances to obtain for said layer a corresponding composite spectrum of induced scalar field distribution matrices; (p) determining from the composite spectrum of induced scalar field distribution matrices for each layer a corresponding actual scalar induced field matrix; (q) determining a second distribution of voltages in each layer from the actual scalar induced field matrix for said layer; and (r) combining corresponding voltages of the first and second distribution of voltages determined for each layer to obtain a new distribution of voltages in said layer.

Step (d) can include determining for each current vector element on each layer at least one vector point source on said layer, wherein each vector point source comprises a magnitude, and determining a Fourier transform of the magnitudes of the vector point sources on each discrete layer to obtain the current spectrum for said layer.

Step (f) can include determining a Fourier transform of each instance of the first em field distribution to obtain the corresponding first em field spectrum.

Step (g) can include determining a dot product of the current spectrum determined for said layer in step (d) times the first em field spectrum determined for said instance of said layer in step (f) to obtain the spectrum of the induced vector field distribution matrix for said instance of said layer.

Step (h) can include summing the spectrums of the induced vector field distribution matrices associated with said instances to obtain the corresponding composite spectrum of induced vector field distribution matrices.

Step (i) can include determining an inverse Fourier transform of the composite spectrum of induced vector field distribution matrices for each layer to obtain the actual vector induced field matrix for said layer.

Step (k) can include determining for each scalar charge element on each layer at least one scalar point source of said layer, wherein each scalar point source comprises a magnitude, and determining a Fourier transform of the magnitude of the at least one scalar point source on each layer to obtain the charge spectrum for said layer.

Step (m) can include determining a Fourier transform of each instance of second em field distribution to obtain the corresponding second em field spectrum.

Step (n) can include determining a dot product of the charge spectrum determined for said layer in step (k) times the second em field spectrum determined for said instance of said layer in step (m) to obtain the spectrum of the induced scalar field distribution matrix for said instance of said layer.

Step (o) can include summing the spectrums of the induced scalar field distribution matrices associated with said instances to obtain the corresponding composite spectrum of induced scalar field distribution matrices.

Step (p) can include determining an inverse Fourier transform of the composite spectrum of induced scalar field distribution matrices for each layer to obtain the actual scalar induced field matrix for said layer.

For each via that electrically connects conductors on adjacent layers of the multi-layer circuit design, the method can further include, determining a first portion of a current vector element on a first layer related to a current entering the via; combining the first portion of the current vector element with at least one current vector element on the first layer determined under the assumption that the via does not exist to obtain a first resultant current vector element related to the current entering the via; substituting the first resultant current vector element for the current vector element determined for the first layer under the assumption that the via does not exist; determining a second portion of the current vector element on a second, adjacent layer related to the current exiting the via; combining the second portion of the current vector element with at least one current vector element on the second layer determined under the assumption that the via does not exist to obtain a second resultant current vector element related to the current exiting the via; and substituting the second resultant current vector element for the current vector element determined for the second layer under the assumption that the via does not exist.

For each via that electrically connects conductors on adjacent layers of the multi-layer circuit design, the method can further include, determining a first portion of a scalar charge element on a first layer related to a current entering the via; combining the first portion of the scalar charge element with at least one scalar charge element on the first layer determined under the assumption that the via does not exist to obtain a first resultant scalar charge element related to the current entering the via; substituting the first resultant scalar charge element for the scalar charge element determined for the first layer under the assumption that the via does not exist; determining a second portion of the scalar charge element on a second, adjacent layer related to the current exiting the via; combining the second portion of the scalar charge element with at least one scalar charge element on the second layer determined under the assumption that the via does not exist to obtain a second resultant scalar charge element related to the current exiting the via; and substituting the second resultant scalar charge element for the scalar charge element determined for the second layer under the assumption that the via does not exist.

Each current vector element can be comprised of a vector sum of an x-current vector element and a y-current vector element and steps (d)–(i) can be performed separately for the x-current vector elements and the y-current vector elements. Step (i) can further include combining the actual vector induced field matrix determined for the x-current vector elements of each layer with the actual vector induced field matrix determined for the y-current vector elements of said layer, on a cell-by-cell basis, to obtain the actual vector induced field matrix that is utilized in step (j) to determine the first distribution of voltages in said layer.

The invention is also a computer aided method of determining a distribution of voltages or currents in conductors of a multi-layer circuit design in response to application of a bias to said circuit design. The method includes (a) defining top and bottom layers for each conductor in each level of a multi-layer circuit design; (b) discretizing the conductive portion of each layer into a plurality of mesh elements, with adjacent mesh elements in each layer defining an edge therebetween, with adjacent layers of the same conductor having edges of their respective mesh elements in alignment; (c) discretizing the flow of an exemplary current through each mesh element into at least one current vector element; (d) determining for each current vector element at least one scalar charge element related to a derivative of the current vector element; (e) defining a rectangular grid for each layer, with the rectangular grids having the same spatial relationship as the corresponding layers and being identical to each other; (f) discretizing the current vector elements of each layer on the corresponding rectangular grid; (g) determining a current spectrum for each rectangular grid from the discretized current vector elements on said rectangular grid; (h) determining for each pair of rectangular grids a first electromagnetic (em) field induced in one of said pair of rectangular grids (target grid) due to at least one discretized current vector element in the other of said pair of rectangular grids (source grid), wherein the pairs of rectangular grids include each rectangular grid acting as both the target grid and the source grid, and each rectangular grid acting as the target grid for each other rectangular grid acting as the source grid; (i) determining a first em field spectrum for each instance of the first em field; (j) for each instance of each rectangular grid acting as the target grid of a pair of grids, combining the current spectrum determined for said rectangular grid in step (g) with the first em field spectrum determined for said instance of said rectangular grid in step (i) to obtain therefor a spectrum of an induced vector field distribution matrix; (k) combining the spectrums of the induced vector field distribution matrices associated with the instances of each rectangular grid acting as the target grid of a pair of grids to obtain a composite spectrum of the induced vector field distribution matrices for said rectangular grid; (l) determining an actual vector induced field matrix for each rectangular grid from the composite spectrum of the induced vector field distribution matrices for said rectangular grid; (m) determining a voltage that is induced where each current vector element resides on each rectangular grid from the actual vector induced field matrix for said rectangular grid; (n) discretizing the scalar charge elements of each layer on the corresponding rectangular grid; (o) determining a charge spectrum for each rectangular grid from the discretized scalar charge elements on said rectangular grid; (p) determining for each pair of rectangular grids a second em field induced in one of said pair of rectangular grids (target grid) due to at least one discretized scalar charge element in the other of said pair of rectangular grids (source grid), wherein the pairs of rectangular grids include each rectangular grid acting as both the target grid and the source grid, and each rectangular grid acting as the target grid for each other rectangular grid acting as the source grid; (q) determining a second em field spectrum for each instance of the second em field; (r) for each instance of each rectangular grid acting as the target grid of a pair of grids, combining the charge spectrum determined for said rectangular grid in step (o) with the second em field spectrum determined for said instance of said rectangular grid in step (q) to obtain therefor a spectrum of an induced scalar field distribution matrix; (s) combining the spectrums of the induced scalar field distribution matrices associated with the instances of each rectangular grid acting as the target grid of a pair of grids to obtain a composite spectrum of the induced scalar field distribution matrices for said rectangular grid; (t) determining an actual scalar induced field matrix for each rectangular grid from the composite spectrum of the induced scalar field distribution matrices for said rectangular grid; (u) determining a voltage that is induced where each scalar charge element resides on each rectangular grid from the actual scalar induced field matrix for said rectangular grid; and (v) combining the voltage determined for each current vector element in step (m) with the voltage determined for the corresponding scalar charge element in step (u) to obtain a first voltage that has been induced on the edge of the mesh element that resides at the corresponding location on the rectangular grid due to the em effects of the exemplary current flowing in each mesh element.

Step (g) can include determining a Fourier transform of the discretized current vector elements on each rectangular grid to obtain the current spectrum for said rectangular grid. Step (i) can include determining a Fourier transform of each first em field to obtain the first em field spectrum therefor. Step (j) can include determining a dot product of the current spectrum for said rectangular grid times the first em field spectrum for said instance of said rectangular grid. Step (k) can include summing, on a cell-by-cell basis, the spectrums of the induced vector field distribution matrices associated with the instances of each rectangular grid acting as the target grid of a pair of grids to obtain for said rectangular grid the composite spectrum of the induced vector field distribution matrices. Step (l) can include determining an inverse Fourier transform of the composite spectrum of the induced vector field distribution matrices determined for each rectangular grid to obtain the actual vector induced field matrix for said rectangular grid. Step (o) can include determining a Fourier transform of the discretized scalar charge elements on each rectangular grid to obtain the charge spectrum for said rectangular grid. Step (q) can include determining a Fourier transform of each second em field to obtain the second em field spectrum therefor. Step (r) can include determining a dot product of the charge spectrum for said rectangular grid times the second em field spectrum for said instance of said rectangular grid. Step (s) can include summing, on a cell-by-cell basis, the spectrums of the induced scalar vector field distribution matrices associated with the instances of each rectangular grid acting as the target grid of a pair of grids to obtain for said rectangular grid the composite spectrum of the induced scalar field distribution matrices. Step (t) can include determining an inverse Fourier transform of the composite spectrum of the induced scalar field distribution matrices determined for each rectangular grid to obtain the actual scalar induced field matrix for said rectangular grid.

In the method each mesh element can be triangular-shaped and step (c) can include discretizing the flow of the exemplary current through each triangular mesh element into a current vector element that flows through at least one edge of the triangular mesh element.

For each via that electrically connects conductors on adjacent layers of the multi-layer circuit design, the method can further include decomposing a current vector element entering a first end of the via and exiting a second end of the via into first and second portions, respectively; combining the first portion of the current vector element with a current vector element associated with the first end of the via, wherein the latter current vector element is determined under the assumption that the via does not exist, to obtain a first resultant current vector element related to the current entering the via; substituting the first resultant current vector element related to the current entering the via for the current vector element associated with the first end of the via that was determined under the assumption that the via does not exist; combining the second portion of the current vector element with the current vector element associated with a second end of the via, wherein the latter current vector element is determined under the assumption that the via does not exist, to obtain a second resultant current vector element related to the current exiting the via; and substituting the second resultant current vector element related to the current exiting the via for the current vector element associated with the second end of the via that was determined under the assumption that the via does not exist.

For each via that electrically connects conductors on adjacent layers of the multi-layer circuit design, the method can further include decomposing a scalar charge element entering a first end of the via and exiting a second end of the via into first and second portions, respectively; combining the first portion of the scalar charge element with a scalar charge element associated with the first end of the via, wherein the latter scalar charge element is determined under the assumption that the via does not exist, to obtain a first resultant scalar charge element related to the current entering the via; substituting the first resultant scalar charge element related to the current entering the via for the scalar charge element associated with the first end of the via that was determined under the assumption that the via does not exist; combining the second portion of the scalar charge element with the scalar charge element associated with a second end of the via, wherein the latter scalar charge element is determined under the assumption that the via does not exist, to obtain a second resultant scalar charge element related to the current exiting the via; and substituting the second resultant scalar charge element related to the current exiting the via for the scalar charge element associated with the second end of the via that was determined under the assumption that the via does not exist.

Desirably, the magnitude of the current entering the via is the same as the magnitude of the current exiting the via.

Each current vector element can be comprised of the vector sum of an x-oriented vector element and a y-oriented vector element and steps (f)–(m) can be performed separately for the x-oriented vector elements and the y-oriented vector elements. Step (m) can further include determining the vector sum of the x-oriented vector element and y-oriented current vector element of each current vector element to obtain the voltage that is induced where the current vector element resides on the rectangular grid.

The method can further include determining for each mesh element pair sharing an edge through which a current vector element flows (target mesh element pair) a voltage induced at said edge due to current vector elements and scalar charge elements residing on the edges of each other mesh element pair (source mesh element pair) within a first predetermined distance of the target mesh element pair; for each target mesh element pair, summing the voltages induced at the edge of the target mesh element pair due to current vector elements and scalar charge elements on the edges of source mesh element pairs within the first predetermined distance of the target mesh element pair to obtain a second voltage that has been induced therein; determining for each point on each rectangular grid where each discretized scalar charge element and each discretized current vector element reside the voltage induced at said point due to discretized scalar charge elements and discretized current vector elements within a second predetermined distance of said point; summing the voltages induced at the discretized scalar charge elements and the discretized current vector elements associated with the edge of each target mesh element pair to obtain a third voltage that has been induced therein; and combining the first, second and third voltages determined for the edge of each target mesh element pair to obtain therefor the actual voltage induced thereat.

The actual voltage for the edge of each target mesh element pair can equal the sum of the first and second voltages for the edge of the target mesh element pair minus the third voltage for the edge of the target mesh element pair.

One or more of the steps of each of the foregoing methods can be embodied on computer readable medium as instructions which, when executed by a processor, cause the processor to perform said one or more steps.

BRIEF DESCRIPTION OF THE DRAWINGS

FIGS. 1a–1c are a flowchart of a method in accordance with the present invention;

FIG. 2 is a cross-sectional side view of an integrated circuit illustrating conductors on three separate layers of the circuit with a via extending between conductors in the top two layers of the circuit;

FIG. 3 is an isolated side view of the three conductors shown in FIG. 2 after each conductor has been discretized into individual top layers and bottom layers;

FIG. 4 is an isolated perspective view of the discretized top and bottom layers of the conductors shown in FIG. 3, with each discretized layer separated into a plurality of mesh elements;

FIG. 5 is a perspective view of each discretized layer and its mesh elements shown in FIG. 4 superimposed on a portion of a corresponding rectangular grid;

FIG. 6a is an isolated view of a pair of mesh elements having a current vector element projected on a portion of one of the rectangular grids in FIG. 5 and corresponding vector point sources;

FIG. 6b is a view of the pair of mesh elements shown in FIG. 6a with discretized vector point sources replacing the vector point source shown in FIG. 6a;

FIG. 7 is a perspective view of an actual vector induced field matrix and an actual scalar induced field matrix on one of the rectangular grids shown in FIG. 5;

FIG. 8 is a matrix of discretized layers versus discretized layers including elements where voltages determined prior to the application of a pre-correction have computational errors associated therewith;

FIG. 9a is an isolated perspective view of a pair of adjacent discrete layers and their mesh elements with a via extending between the pair of discrete layers;

FIG. 9b is an isolated perspective view of a pair of rectangular grids corresponding to the discrete layers shown in FIG. 9a.

DETAILED DESCRIPTION OF THE INVENTION

Figure 10:
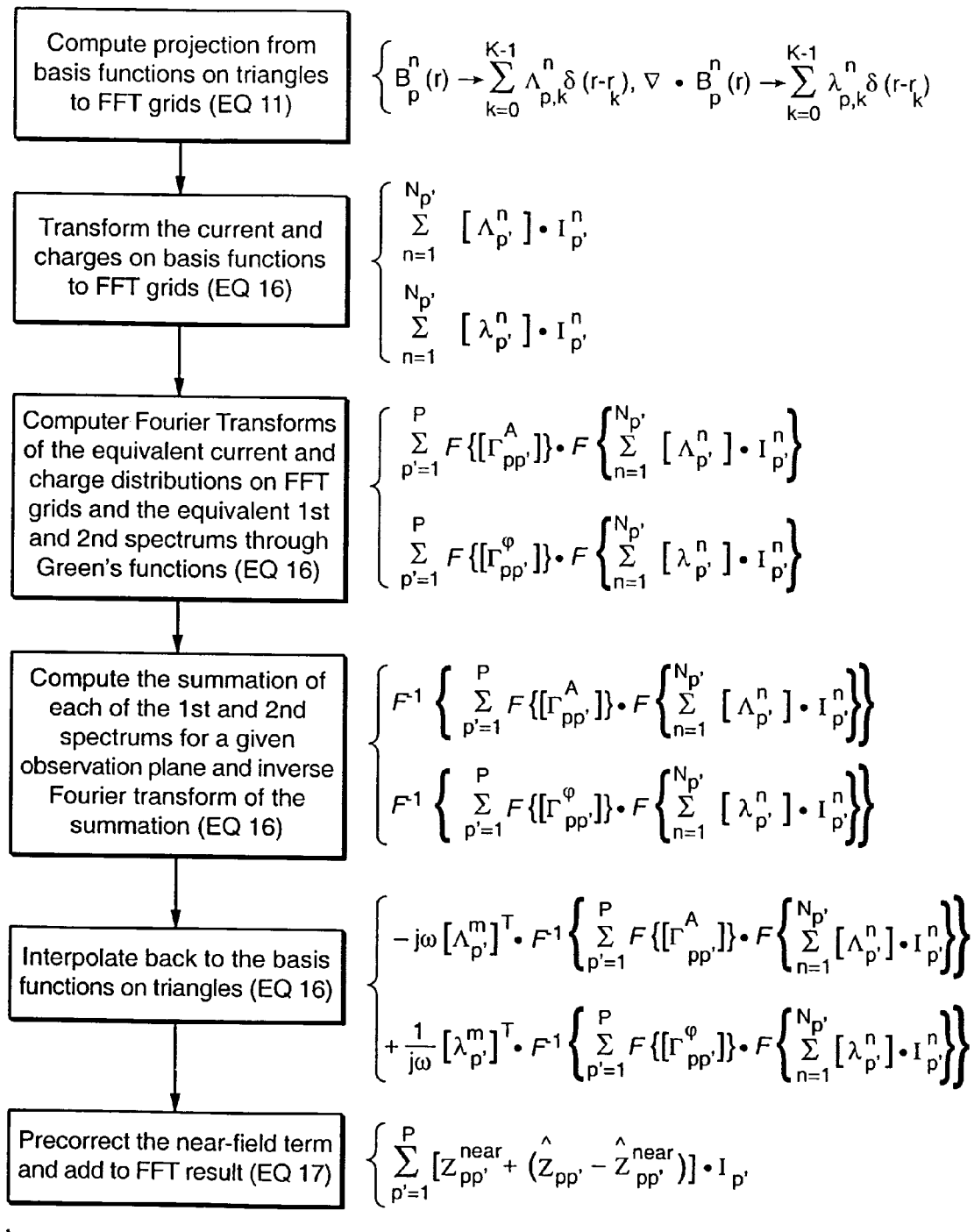
FIG. 10 is flowchart summary of the algorithms utilized to implement the present invention.

The present invention will be described with reference to the accompanying figures where like reference numbers correspond to like elements.

The present invention is a method which is desirably embodied in a computer readable program code which executes on a processor of a computer system, e.g., a stand-alone or networked computer or work station, that includes a computer storage, an input/output system, such as a keyboard, mouse and monitor, a media drive, such as a disk drive, CD ROM drive, etc., and a computer-useable storage medium capable of storing the computer readable program code that embodies the present invention. Under the control of the computer readable program code, the processor is capable of configuring and operating the computer system in a manner known in the art to implement the present invention. Computer systems of the type described above are well known in the art and are not described herein for purpose of simplicity.

With reference to FIGS. 1a–1c and 2, it is well known in the art that each integrated circuit 30 formed on a semiconductor wafer typically includes a plurality of layers 32, 34 and 36, each of which includes corresponding interconnects or conductors 42, 44 and 46, respectively, that connect active devices, passive devices, or both formed on integrated circuit 30 or which define one or more passive devices, such as an inductor (not shown), on integrated circuit 30. Layers 32, 34 and 36 are separated from each other by insulating material 38, such as a thermally grown oxide. Integrated circuit 30 also includes a substrate of semiconducting material 40 that can be suitably doped in a manner known in the art to create one or more junctions of active devices that are formed on integrated circuit 30.

A layout of devices and conductors of multi-layered integrated circuit 30 is accomplished in a manner known in the art before the integrated circuit 30 is actually implemented on a semiconductor wafer. Once this layout is complete, but before the integrated circuit 30 is manufactured, the electromagnetic effects of current flowing in the conductors, e.g., conductors 42, 44 and 46, of each layer, e.g., layers 32, 34 and 36, of integrated circuit 30 in response to the application of exemplary voltage(s) to integrated circuit 30 is desirably determined in accordance with the steps of the flowchart shown in FIGS. 1a–1c to ensure the manufactured integrated circuit 30 will operate according to its design specifications.

Commencing at start step 1, the method advances to step 2 wherein conductors 42, 44 and 46 of circuit layers 32, 34 and 36, respectively, are initially discretized into discrete top layers 42t, 44t and 46t and discrete bottom layers 42b, 44b and 46b, respectively, as shown in FIG. 3. In the method shown in the flowchart of FIGS. 1a–1c, any conductive via 48 that electrically connects conductors in adjacent circuit layers of integrated circuit 30 is initially ignored. The treatment of these vias in accordance with the present invention will be described in greater detail hereinafter.

With reference to FIG. 4 and with continuing reference to all previous figures, the method then advances to step 3 wherein the conductive portion of each discrete circuit layer is discretized into a plurality of mesh elements 50, with adjacent mesh elements 50 in each discrete layer defining an edge 52 therebetween and with edges 52 of mesh elements 50 in adjacent discrete layers of the same conductor, e.g., discrete layer 42t and 42b of conductor 42, positioned in vertical alignment with each other. In FIG. 4, each mesh element 50 is illustrated as having a triangular shape having the same size as each other mesh element 50. However, this is not to be construed as limiting the invention since the use of mesh elements 50 having different shapes and/or different sizes is envisioned. Triangular shaped mesh elements 50, however, are desirable since they offer high flexibility in modeling of complex geometries.

Next, the method advances to step 4 wherein the portion of an exemplary current that flows across the edge 52 of each pair of mesh elements 50 in response to the application of the exemplary voltage(s) to circuit 30 is discretized into at least one discrete current vector element. More specifically, the exemplary voltage(s) applied to integrated circuit 30 is (are) discretized into exemplary discretized voltages (not shown) on layers 42t–46b. Utilizing these exemplary discretized voltages, the exemplary current that flows across the edge of each pair of mesh elements 50 and, hence, the at least one discrete current vector element that flows thereacross can be determined. For example, in FIG. 4, an edge 52 of a pair of mesh elements 50 in each discrete layer 42t–46b includes a discrete current vector element 56–66, respectively, flowing perpendicularly thereacross. The illustration in FIG. 4 of only one discrete current vector element flowing through or across one edge 52 in each discrete layer, however, is not to be construed as limiting the invention since each edge 52 of each pair of mesh elements 50 in each discrete layer desirably has a discrete current vector element flowing thereacross, even if the value of the discrete current vector element is zero (0).

The method then advances to step 5 wherein at least one discrete scalar charge element, e.g., 56'–66', related to a derivative of the corresponding discrete current vector element, e.g., 56–66 respectively, is determined.

With reference to FIG. 5 and with continuing reference to all previous figures, the method then advances to step 6 wherein, for computational purposes, a rectangular grid is defined for each discrete circuit layer. The thus defined rectangular grids are arranged in the same spatial relationship as the corresponding discrete circuit layers. For example, rectangular grids 72t, 72b, 74t, 74b, 76t and 76b are defined for discrete circuit layers 42t, 42b, 44t, 44b, 46t and 46b, respectively. Each rectangular grid 72t–76b includes a plurality of rectangular cells 78.

The method then advances to step 7 wherein a plurality of discrete vector point sources 68 is determined for each discrete current vector element. Stated differently, each discrete vector element on each discrete layer is discretized into a plurality of discrete current vector point sources 68 on the corresponding rectangular grid. Desirably, discrete vector point sources 68 associated with discrete current vector elements in adjacent mesh elements 50 are arranged to at least partially overlap each other. Each discrete vector point source 68 has a magnitude and a direction vector associated therewith.

In step 7, a plurality of discrete scalar point sources 68' is also determined for each discrete scalar charge element 56'–66'. Stated differently, each discrete scalar charge element on each discrete layer is discretized into a plurality of scalar points sources 68' on the corresponding rectangular grid. Desirably, discrete scalar point sources 68' associated with discrete scalar charge elements in adjacent mesh elements 50 are arranged to at least partially overlap each other. Each discrete scalar point source 68' has associated therewith a magnitude related to the electric charge associated with the scalar point source 68'.

Hereinafter, use the adjective "discrete" preceding "current vector element(s)", "scalar charge element(s)", "vector point source(s)", and "scalar point source(s)" may be eliminated for simplicity. However, it is to be understood that each of these elements and sources are discrete and not continuous in a mathematical sense.

The vector point sources 68 associated with each current vector element can be envisioned as a plurality of dipole antenna which are arranged in a manner whereupon the electromagnetic fields output by the antennas combine in a manner that would produce the same electromagnetic (em) field as a current vector element positioned at least three (3) cells 78 away from the cell 78 that includes the current vector element that was utilized to determine the corresponding vector point source 68. The scalar point sources 68' associated with each scalar charge element can be envisioned as a plurality of electric point charges that are arranged in a manner whereupon the electromagnetic fields output by the electric point charges combine in a manner that would produce the same electromagnetic (em) field as a scalar charge element positioned at least three (3) cell 78 away from the cell 78 that includes the scalar charge element that was utilized to determine the corresponding scalar point source 68'.

With reference to FIGS. 6a and 6b and with continuing reference to all previous figures, the vector point source(s) 68 associated with each current vector element, e.g., 56–66, are located on the corresponding rectangular grid in a predetermined spatial relation to the location of the corresponding current vector element on the corresponding layer. Similarly, the scalar point source(s) 68' associated with each scalar charge element, e.g., 56'–66', are located on the corresponding rectangular grid in a predetermined spatial relation to the location of the corresponding scalar charge element on the corresponding layer. In FIG. 5, pairs of mesh elements 50 are illustrated residing in a rectangular cell 78. However, this is not to be construed as limiting the invention since, as shown in FIGS. 6a and 6b, mesh elements 50 can be projected onto their corresponding rectangular grid without regard to the boundaries of the rectangular cells 78 comprising rectangular grid 72. FIGS. 6a and 6b also illustrate that each mesh element 50 can have a different size, with the size of each mesh element 50 being determined by the amount of resolution desired. For example, smaller size mesh elements 50 are utilized where greater resolution is required whereas larger size mesh elements 50 are utilized where less resolution is desired. The use of smaller and larger size mesh elements 50 helps improve computational efficiency by avoiding the use of two or more small size mesh elements 50 where a single large size mesh element 50 is sufficient.

FIG. 6a shows a subset of cells 78 of a portion of rectangular grid 72t having an isolated pair of adjacent mesh elements 50a and 50b that share an edge 52 having current vector elements 56 that flows thereacross and vector point sources 68a and 68b resulting from the effect of the flow of current vector element 56 in mesh element 50a and 50b, respectively. FIG. 6a also shows scalar point sources 68a' and 68b' resulting from scalar charge element 56' determined from current vector element 56. For computational purposes, each vector point source 68 desirably overlays one of the scalar point sources 68'. However, this is not to be construed as limiting the invention since such overlay is not necessary.

FIG. 6b shows the same pair of mesh elements shown in FIG. 6a but with vector point source 68a and 68b replaced by x-oriented vector point sources 82a and 82b and y-oriented vector point sources 84a and 84b, respectively.

The method then advances to step 8, wherein a current spectrum of a first electromagnetic (em) field induced in each rectangular grid is determined from the vector point sources 68 on the rectangular grid. More specifically, the current spectrum of the first em field induced in each rectangular grid is determined by taking a two-dimensional (2D) Fourier transform, desirably a 2D fast Fourier transform (FFT), of the magnitudes of the vector point sources 68 on the rectangular grid.

As is well known in the art of electrical engineering, an electromagnetic field is produced in response to the flow of current in a conductor. In addition to interacting with the conductor in which the current flows, this electromagnetic field also propagates through space whereupon it can interact with other conductors on the same circuit layer or on other circuit layers.

Next, the method advances to step 9 wherein, for each pair of rectangular grids, a discretized first electromagnetic field induced in one of the pair of rectangular grids (target grid) due to a single vector point source 68 located at a predetermined point, e.g., the origin, on the other of the pair of rectangular grids (source grid) is determined. Desirably, the predetermined points on the rectangular grids are in alignment. The pairs of rectangular grids include each rectangular grid acting as both the target and the source grid. In addition, the pairs of rectangular grids include each rectangular grid acting as a target grid for each other rectangular grid, one-at-a-time, acting as a source grid.

For example, in FIG. 5, the discretized first electromagnetic field induced in rectangular (target) grid 72t due to a single vector point source 68 located at the predetermined point on rectangular (source) grid 72t is determined. This discretized first electromagnetic field is represented in FIG. 5 by discrete points 70 coincident with vector point sources 68. Next, another discretized first electromagnetic field induced in rectangular (target) grid 72t due to a single vector point source 68 located at the predetermined point on rectangular (source) grid 72b is determined. This process is repeated until a discretized first electromagnetic field induced in rectangular grid 72t, acting as the target grid, due to a single vector point source 68 located at the predetermined point on each rectangular grid 74t, 74b, 76t and 76b acting, one-at-a-time as a source grid is determined. This procedure is then repeated for each other rectangular grid, i.e., rectangular grids 72b, 74t, 74b, 76t and 76b, acting as a target grid. Once this process is completed for the rectangular grids shown in FIG. 5, each rectangular grid will have six instances of a discretized first electromagnetic field induced thereon due to a single point source 68 located at a predetermined point on the rectangular grid itself and located at the predetermined point on each of the other five other rectangular grids.

For computational purposes, each discrete point 70 of the discretized first electromagnetic field induced in each instance of each rectangular grid acting as the target grid desirably resides at the same point as a vector point source 68. However, this is not to be construed as limiting the invention. The determination of the discretized first electromagnetic field induced in a target grid due to a single vector point source 68 on a source grid is accomplished in a straightforward manner utilizing a Green's function which is well known in the art of electrical engineering.

Thereafter, the method advances to step 10 wherein a two-dimensional (2D) Fourier transform, e.g., a 2D FFT, of each discretized first electromagnetic (em) field is taken to obtain a corresponding first electromagnetic field spectrum.

Next, the method advances to step 11 wherein for each instance of each rectangular grid acting as the target grid of a pair of grids, the current spectrum determined for the rectangular grid is combined with the first electromagnetic field spectrum determined for said instance of the rectangular grid to obtain a spectrum of an induced vector field distribution matrix for said instance of the rectangular grid. More specifically, the spectrum of the induced vector field distribution matrix for each instance of the rectangular grid acting as the target grid of a pair of grids is determined by taking, on a cell-by-cell basis, a dot product of the current spectrum determined for the rectangular grid times the first electromagnetic field spectrum determined for said instance of the rectangular grid. As a result of taking the various dot products, each rectangular grid in FIG. 5 acting as a target grid of a pair of grids will have six spectrums of induced vector field distribution matrices associated therewith.

The method then advances to step 12 wherein the spectrums of induced vector field distribution matrices associated with the instances of each rectangular grid acting as the target grid of a pair of grids are summed on a cell-by-cell basis to obtain a composite spectrum of induced vector field distribution matrices for said rectangular grid. For example, for the rectangular grids shown in FIG. 5, the spectrums of the induced vector field distribution matrices associated with the following pairs of rectangular grids are summed on a cell-by-cell basis for rectangular grid 72$t$ acting as the target grid of each pair of rectangular grids: (72$t$, 72$t$), (72$t$, 72$b$), (72$t$, 74$t$), (72$t$, 74$b$), (72$t$, 76$t$) and (72$t$, 76$b$). Similar comments apply in respect of combining the spectrums of the induced vector field distribution matrices associated with each other rectangular grid, i.e., rectangular grids 72$b$, 74$t$, 74$b$, 76$t$ and 76$b$, acting as the target grid of a pair of grids to obtain a corresponding composite spectrum of induced vector field distribution matrices therefor.

With reference to FIG. 7 and with continuing reference to all previous figures, the method advances to step 13 wherein an actual vector induced field matrix 90 is determined for each rectangular grid by taking an inverse Fourier transform, e.g., inverse 2D FFT, of the composite spectrum of induced vector field distribution matrices for the rectangular grid.

The actual vector induced field matrix 90 determined for each rectangular grid can be envisioned as having an outline conforming to the outline of the rectangular grid. Each cell of the actual vector induced field matrix 90 will include therein a field sample point 92 representing the electromagnetic field produced at the corresponding location on the rectangular grid as a result of the current flowing on all of the rectangular grids. More specifically, each field sample points 92 represents the electromagnetic field produced at the corresponding location as a result of the current vector elements on all of the rectangular grids. Field sample points 92 desirably coincide with vector point sources 68. However, this is not to be construed as limiting the invention.

The method then advances to step 14 wherein the voltage induced at each current vector element, e.g., 56–66, on the rectangular grid is determined from the field sample points 92 of the actual vector induced field matrix 90 for said grid. FIG. 7 illustrates actual vector induced field matrix 90 superimposed on rectangular grid 72$t$ including current vector element 56 superimposed thereon. Actual vector induced field matrix 90 includes field sample points 92 that correspond to the electromagnetic field produced at the corresponding locations on rectangular grid 72$t$. Utilizing the electromagnetic fields represented by field sample points 92, the voltage induced at each current vector element, e.g., 56–66, can be determined. Desirably, an array of 9×9 field sample points 92 surrounding each current vector element, e.g., 56–66, is utilized to determine the voltage induced thereat.

Desirably, the foregoing process for determining the actual vector induced field matrix 90 for each rectangular grid is performed separately for the x-oriented vector point sources 82 of vector point sources 68 and for the y-oriented vector point sources 84 of vector point sources 68. The x-oriented vector point sources 82 will result in an actual x-oriented induced field matrix (not shown) while the y-oriented vector point sources 84 will result in an actual y-oriented induced field matrix (not shown). These two field matrices can be summed together, on a cell-by-cell basis, to obtain the actual vector field induced matrix 90 on the rectangular grid from which the voltage produced at each current vector element, e.g., 56–66, on the rectangular grid can be determined.

The method then advances to step 15 wherein a charge spectrum of a second em field induced in each rectangular grid is determined from the distribution of charges on the rectangular grid due to the scalar charge elements, e.g., 56'–66', projected thereon.

In order to determine the distribution of charges on each rectangular grid, the magnitudes of the scalar point sources 68' that overlap each other on the rectangular grid are summed together on the rectangular grid while the magnitudes of the scalar point sources 68' that do not overlap retain their assigned magnitude on the rectangular grid. Once the magnitudes of the overlapping scalar point sources 68' have been summed together on the rectangular grid, the magnitude at each point on the rectangular grid where a scalar point source 68' resides represent the distribution of electric charges on the rectangular grid.

Utilizing this distribution of electric charges on each rectangular grid, the charge spectrum of the second em field induced in each rectangular grid is determined by taking a Fourier transform, e.g., a 2D FFT, of the distribution of charges on the rectangular grid.

Next, the method advances to step 16 wherein, for each pair of rectangular grids, a discretized second electromagnetic field induced in one of the pair of rectangular grids (target grid) due to a single scalar point source 68' located at a predetermined location, e.g., the origin, on the other of the pair of rectangular grids (source grid) is determined. Since this procedure is similar to the procedure described above for determining for each pair of rectangular grids the discretized first electromagnetic field induced in one of the pair of rectangular grids (target grid) due to a single vector point source located at a predetermined location on the other of the pair of rectangular grids (source grid), a detailed description of this procedure is not included herein to avoid redundancy.

As discussed above, the pairs of rectangular grids include each rectangular grid acting as both the target grid and the source grid along with each rectangular grid acting as the target grid for each other rectangular grid acting as the source grid. As would be appreciated by one skilled in the art, the determination of the discretized second electromagnetic field induced in a target grid due to the single scalar point source 68' located at the origin of a source grid is accomplished in a straightforward manner utilizing a Green's function well known in the art of electrical engineering.

The method then advances to step 17 wherein a second electromagnetic field spectrum is determined for each instance of a discretized second electromagnetic field by taking a Fourier transform, e.g., 2D FFT, of the discretized second electromagnetic field.

The method then advances to step 18 wherein, for each instance of each rectangular grid acting as the target grid of a pair of grids, the charge spectrum determined for the rectangular grid is combined with the second electromagnetic field spectrum determined for said instance of the rectangular grid to obtain for the rectangular grid a spectrum of an induced scalar field distribution matrix. More specifically, for each instance of each rectangular grid acting as the target grid of a pair of grids, a dot product is taken, on a cell-by-cell basis, of the charge spectrum for the rectangular grid times the second electromagnetic field spectrum for said instance of the rectangular grid to obtain therefor the spectrum of the induced scalar field distribution matrix. As a result of taking the various dot products, each rectangular grid in FIG. 5 acting as a target grid of a pair of grids will have six spectrums of induced scalar field distribution matrices associated therewith.

Next, the method advances to step 19 wherein the spectrums of induced scalar field distribution matrices associated with the instances of each rectangular grid acting as a target grid of a pair of grids are combined, i.e., summed on a cell-by-cell basis, to obtain a composite spectrum of induced scalar field distribution matrices for the rectangular grid. Since this process is the same as a process described above for obtaining the composite spectrum of induced vector field distribution matrices, a detailed description of this process is not included herein to avoid redundancy.

The method then advances to step 20 wherein, from the composite spectrum of the induced scalar field distribution matrices determined for each rectangular grid, an actual scalar induced field matrix 90' is determined for the rectangular grid by taking an inverse Fourier transform, e.g., an inverse 2D FFT, of the composite spectrum of induced scalar field distribution matrices for the rectangular grid.

Each actual scalar induced field matrix 90' includes field sample points 92', each of which represents the electromagnetic field produced at the corresponding location on the rectangular grid due to the scalar point sources 68' in all of the rectangular grids. Field sample points 92' desirably coincide with scalar point sources 68'. However, this is not to be construed as limiting the invention.

The method then advances to step 21 wherein, from the actual scalar induced field matrix 90' determined for each rectangular grid, the voltage induced at each scalar charge element, e.g., 56'–66', on the rectangular grid is determined from the field sample points 92' of the actual scalar induced field matrix 90' for said grid. More specifically, the voltage induced at each scalar charge element, e.g., 56'–66', on each rectangular grid is determined by interpolating for the scalar charge element the effect of the electromagnetic field produced thereat by each field sample point 92' on the rectangular grid.

The method then advances to step 22 wherein the voltage that was determined to be induced where each current vector element, e.g., 56–66, resides is summed with the voltage that was determined to be induced where the corresponding scalar charge element, e.g., 56'–66', resides to obtain a first voltage (V1) induced across the edge 52 of the pair of mesh elements 50 associated with the corresponding current vector element and scalar charge element.

Thereafter, the method shown in the flowchart of FIG. 1c advances to step 23 wherein, a "pre-correction" is determined for each first voltage (V1).

With reference to FIG. 8, it has been observed that the first voltages (V1) determined in the above-described manner have computational errors associated therewith. Hence, these first voltages (V1) do not represent the actual voltages (AV) that have been induced at the corresponding locations on the discrete layers. FIG. 8 is a matrix 112 of discrete layers (42t–46b) versus discrete layers (42t–46b) including elements 114 wherein first voltages (V1) determined in the above-described manner have computational errors associated therewith. The abscissa of matrix 112 represents each discrete layer 42t–46b acting as a source layer whereas the ordinate matrix of matrix 112 represents each discrete layer 42t–46b acting as the target layer.

To avoid these computational errors, a voltage induced across the edge 52 of each pair of mesh elements 50 (target mesh element pair) due to the current vector elements and scalar charge elements residing on the edge of each pair of mesh elements (source mesh element pair) within a predetermined distance, i.e., the near field, of the target mesh element pair (including the target mesh element pair itself acting as a source mesh element pair, and source mesh element pairs in both the top (t) and bottom (t) layers of the same conductor 42, 44 or 46) is determined.

The voltages induced across the edge 52 of each target mesh element pair due to current vector elements and scalar charge elements residing on the edges 52 of source mesh element pairs in the near field of the target mesh element pair are summed together to obtain a second voltage (V2) induced across the edge 52 of the target mesh element pair.

Next, a third voltage (V4) induced across the edge of each target mesh element pair is determined from the vector point sources 68 and the scalar point sources 68'. Specifically, for each point of each target mesh element pair where a vector point source 68 and a scalar point source 68' reside, the voltage induced at said point due to the field induced at said point by vector point sources 68 and scalar point source 68' in the near field of said point is determined. (This includes the voltage induced at said point due to the field induced at said point by the vector point source 68 and the scalar point source 68' residing at said point). Once the voltage induced at each such point has been determined, the voltages induced at points associated with the edge of each target mesh element pair are summed together to obtain the third voltage (V4) induced across the edge of the target mesh element pair.

Next, the actual or pre-correction voltage (AV) induced across the edge of each pair of mesh elements is determined utilizing the following equation:

$$AV = V2 + (V1 - V3).$$

The method then advances to step 24 wherein the actual voltage (AV) determined to be induced across the edge of each pair of mesh elements in the current iteration of step 23 is compared to the voltage induced across said edge due to the application of the exemplary discretized voltage to integrated circuit 30 to determine whether they are within predetermined, acceptable tolerances of each other. If not, the method advances to step 25 for determination of another new exemplary current flowing in each circuit layer of the multi-layer circuit based on the actual voltages determined for said circuit layer in the current iteration of step 23. Thereafter, the method advances to step 26 for return to start step 1 and the subsequent repetition of steps 2–24. However, if it is determined in step 24 that the actual voltage determined to be induced across the edge of each pair of mesh elements in the current iteration of step 23 and the voltage induced across said edge due to the application of the exemplary discretized voltages are within acceptable tolerances of each other, the method advances to stop step 27.

With reference to FIG. 8, and with continuing reference to all previous figures, in the foregoing description the effect of via 48 was not considered. However, in order to completely characterize the effects on the operation of the circuit due to voltages induced on conductors 42–46, it is necessary to consider the effect of current flowing in each via. To this end, utilizing the theory of conservation of current, namely, the current entering a via equals the current exiting a via, the effect of current flow in each via can be reflected in the mesh elements 50 associated with the ends of the via.

In FIG. 9a, the edge of mesh elements 50a and 50b represent the intersection of one edge of via 48 (shown in phantom) and layer 42b and the edge of mesh elements 50c and 50d represent the intersection of another edge of via 48 and layer 44t. A current vector element 96, comprised of a first portion 96a entering the edge of via 48 formed by mesh elements 50a and 50b of layer 42b and a second portion 96b exiting the edge of via 48 formed by mesh elements 50c and 50d of layer 44t, is then defined as shown in FIG. 9. Current vector element 96 has a magnitude M associated therewith. In decomposition of current vector element 96, both first portion 96a and second portion 96b have a magnitude equal to M. The first portion 96a of current vector element 96 entering via 48 from layer 42b in the direction shown forms the second portion 96b of current vector element 96 exiting via 48 into layer 44t in the direction shown.

Discrete scalar charge elements 98a and 98b related to derivatives of the first and second portions 96a and 96b of current vector element 96 are also determined.

With reference to FIG. 9b, and with continuing reference to FIG. 9a, the first portion 96a of current vector element 96 residing in mesh element 50a of layer 42b is discretized into a plurality of discrete vector point sources 100 which are located at corresponding locations on the corresponding rectangular grid 72b. Each discrete vector point source 100 is shown in FIG. 9b as having an x-oriented vector point source 102 and a y-oriented vector point source 104. Similarly, the second portion 96b of current vector element 96 residing in mesh element 50c of layer 44t is discretized into a plurality of discrete vector point sources 106 which are located at corresponding locations on the corresponding rectangular grid 74t. Each discrete vector point source 106 is shown in FIG. 9b as having x-oriented vector point source 108 and y-oriented vector point source 110.

Each discrete scalar charge element 98a and 98b is discretized into a plurality of scalar point sources 99 on the corresponding rectangular grid. Desirably, discrete scalar point sources 99 associated with discrete scalar charge elements in adjacent mesh elements 50 are arranged to at least partially overlap each other. Each discrete scalar point source 99 has associated therewith a magnitude related to the electric charge associated with the scalar point source 99.

Via 48 is considered to extend not only between layers 42b and 44t, but also between layers 42t and 42b, and 44t and 44b. To account for the extension of via 48 through conductors 42 and 44, first and second portions of a current vector element (not shown) are defined on layers 42t and 42b of conductor 42, and first and second portions of a current vector element (not shown) are defined on layers 44t and 44b of conductor 44 in the same manner that the first and second portions 96a and 96b of current vector element 96 are defined on layers 42b and 44t, respectively. Thereafter, each portion of each current vector element is discretized into a plurality of discrete vector point sources located at the corresponding locations on the corresponding rectangular grid in the manner described above. Thus, the discrete vector point sources determined from the portion of each current vector element defined on each of layer 42t, 42b, 44t and 44b are located at corresponding locations on the corresponding rectangular grids 72t, 72b, 74t and 74b. For example, the discrete vector point sources on rectangular grid 72b are determined from the portion 96a of current vector element 96 and the portion of the current vector element (not shown) formed on layer 42b which has a corresponding portion of the same current vector element on layer 42t. The process of determining discrete vector point sources on each rectangular grid at locations thereon corresponding to the location where each via extends through the corresponding layer of one of the conductors, e.g., 42, 44, 46, continues until all of the discrete vector point sources on each rectangular grid due to the presence of the via have been determined.

Similarly, to account for the extension of via 48 through conductor 42 and 44, scalar charge elements (not shown) are defined on layers 42t and 42b of conductor 42 from the current vector elements defined on layer 42t and 42b, and scalar charge elements (not shown) are defined on layers 44t and 44b of conductor 44 from the current vector elements defined on layers 44t and 44b. Thereafter, each scalar charge element is discretized into a plurality of discrete scalar point sources located at the corresponding locations on the corresponding rectangular grid in the manner described above. The process of determining discrete scalar point sources on each rectangular grid at locations thereon corresponding to the location where each via extends through the corresponding layer of one of the conductors continues until all of the discrete scalar point sources on each rectangular grid due to the presence of the via have been determined.

The magnitude and direction of each discrete vector point source 100 on each rectangular grid is combined, i.e., vector summed, with the magnitude and direction of the discrete vector point source 68 and any other discrete vector point source(s) in alignment therewith to obtain a new (or replacement) magnitude and direction for the vector point source 68. Once the new magnitudes and directions for the vector point sources 68 for the portions of rectangular grids 72t–74b associated with the ends of via 48 have been determined, the first current spectrum of the first em field induced in each rectangular grid 72t–74b can be determined from the new vector point sources 68 for the rectangular grid in the manner described above.

The magnitude of each discrete scalar point source 99 on each rectangular grid is also combined, i.e., vector summed, with the magnitude of the discrete scalar point source 68' and any other discrete scalar point source(s) in alignment therewith to obtain a new (or replacement) magnitude for scalar point source 68'. Once the new magnitudes for the scalar point sources 68' for the portions of rectangular grids 72t–74b associated with the ends of via 48 have been determined, the second current spectrum of the second em field induced in each rectangular grid 72t–74b can be determined from the new scalar point sources 68' for the rectangular grid in the manner described above.

In summary, (i) by combining the magnitudes and directions of the discrete vector point sources 100 associated with each mesh element 50 of a rectangular grid where the end of a via exists with the magnitudes and directions of the corresponding vector point sources 68 determined for the rectangular grid under the assumption that the via does not exist, and (ii) by combining the magnitudes of the discrete scalar point sources 99 associated with each mesh element of a rectangular grid where the end of a via exists to the magnitudes of the corresponding scalar point sources 68' determined for the rectangular grid under the assumption that the via does not exist, the effect of the via on the determination of the current and charge spectrums of the first and second em fields, respectively, induced on the rectangular grid, can be determined. The thus determined current and charge spectrums of the first and second em fields can then be substituted for the current and charge spectrums of the first and second em fields described above in connection with steps 8 and 15, respectively, when determining the actual voltage (AV) induced across the edge of each pair of mesh elements.

Having described the invention with minimal reference to equations, the algorithms underlying the present invention will now be described in detail.

The present invention is an efficient method and apparatus for determining a matrix-vector product solution for use with a full-wave electromagnetic (em) solver for multiple conductors 42–46 in multiple layers 32–36 of an integrated circuit design 30 or printed circuit board design. The em solver determines a method of moments (MoM) solution of the following mixed-potential integral equation (1):

$$\hat{n} \times [-j\omega A(r) - \nabla \phi(r) - Z_S J(r) + E^{inc}(r)] = 0 \ r \in S \text{ where} \quad (1)$$

$$A(r) = \int_S \overline{G}^A(r, r') \cdot J(r') dr'; \quad (2)$$

$$\phi(r) = \int_S G^\phi(r, r') \left(-\frac{1}{j\omega} \nabla' \cdot J(r')\right) dr; \quad (3)$$

S=total area of the multi-layer circuit;
$E^{inc}(r)$=exemplary bias energizing the circuit;
J(r)=exemplary current flow in the circuit layers;
$Z_s$=local surface impedance;

$$-\frac{1}{j\omega} \nabla \cdot J(r) =$$

scalar charge distribution corresponding to the current J(r) flowing in the circuit layers;

$$-j\omega A(r) = -j\omega \int_S \overline{G}^A(r, r') \cdot J(r') dr' =$$

first electric field induced in a circuit layer due to the current J(r) flowing in the circuit layers;

$$\nabla \phi(r) = \frac{1}{j\omega} \nabla \int_S G^\phi(r, r') \cdot \nabla' \cdot J(r') dr' =$$

second electric field induced in the circuit layer due to the scalar charges $$-\frac{1}{j\omega} \nabla \cdot J(r)$$

in the circuit layers;
$-j\omega A(r) - \nabla \phi(r) - Z_s J(r)$=the total induced electric field in the circuit layer;
$\hat{n}$ is a unit vector normal to the surface S; and
$\hat{n} \times E$ is operator defining the tangential component of an electric field vector E on S.

In equation (1), the tangential component of a total induced electric field cancels the tangential component of the electric field of the exemplary bias $E^{inc}(r)$ on surface S.

To solve equation (1), the current density on the surfaces are expanded by a set of basis functions of the type shown in the following equation (4):

$$J(r) = \sum_{i=1}^{N} I_i B_i(r) \quad (4)$$

where
J(r)=exemplary current flow in the circuit layers;
$B_i(r), i=1, \ldots, N$=plurality of current vector elements, e.g., 56–66, distributed throughout the circuit layers and defined on pairs of mesh elements 50; and
$I_i$=weights of current vector elements.

Desirably, the basis function in equation (4) is the Rao-Wilton-Glisson (RWG) basis function defined on pairs of triangular mesh elements 50 that have a common edge 52, which offers high flexibility in modeling of complex geometries with arbitrary shapes. The resultant matrix equation after applying the MoM is given by the following general equation (5), which is the generalized form of the following equation (6):

$$Z \cdot I = V \quad (5)$$

First multiple conductors residing in a multilayer media, with no vias connecting the conductors, are considered. For two-conductors residing in two different layers M1 and M2, the resultant matrix equation can be written as the following equation (6):

$$\begin{bmatrix} Z_{11} & Z_{12} \\ Z_{21} & Z_{22} \end{bmatrix} \cdot \begin{bmatrix} I_1 \\ I_2 \end{bmatrix} = \begin{bmatrix} V_1 \\ V_2 \end{bmatrix} \quad (6)$$

where
$I_1$ and $I_2$=unknown strength of current vector elements in layers M1 and M2, respectively;
$V_1$=plurality of voltages induced in the plurality of current vector elements on layer M1 due to the total electromagnetic field produced thereat by all of the current vector elements, the strength of which are defined by a column of weights $I_1$ on layer M1 and by a column weights $I_2$ on layer M2; and $V_2$=plurality of voltages induced in the plurality of current vector elements on layer M2 due to total electromagnetic field produced thereat by all the current vector elements.

Equation (6) can be viewed as a vector of voltages $$\begin{bmatrix} V_1 \\ V_2 \end{bmatrix}$$

induced in all of the current vector elements due to electromagnetic fields produced by all of the current vector elements in the circuit, which electromagnetic interactions are fully described by the impedance matrix $$\begin{bmatrix} Z_{11} & Z_{12} \\ Z_{21} & Z_{22} \end{bmatrix}.$$

The matrix-vector product $$\begin{bmatrix} Z_{11} & Z_{12} \\ Z_{21} & Z_{22} \end{bmatrix} \cdot \begin{bmatrix} I_1 \\ I_2 \end{bmatrix}$$

is computed iteratively until a desired degree of precision between two or more such computations is achieved for the true vector current element weights $$\begin{bmatrix} I_1^{true} \\ I_2^{true} \end{bmatrix}.$$

The present invention efficiently determines voltages $$\begin{bmatrix} V_1 \\ V_2 \end{bmatrix}$$

induced in a given multilayered circuit due to the presence of current vector elements with magnitudes $$\begin{bmatrix} I_1 \\ I_2 \end{bmatrix}$$

flowing on the planes forming such circuit.

The impedance matrix element for interaction between current vector elements (basis functions) m and n can be expressed by the following equation (7):

$$Z_{pp'}^{mn} = \int_S \int_S \left[ -j\omega B_p^m \cdot B_{p'}^n \cdot G^A(\rho - \rho', z_p, z_{p'}) + \frac{1}{j\omega} \nabla \cdot B_p^m \nabla' \cdot B_{p'}^n \cdot G^\phi(\rho - \rho', z_p, z_{p'}) \right] d\rho \, d\rho' - \delta_{pp'}^{mn} \int_S Z_S B_p^m \cdot B_{p'}^n \, d\rho \qquad (7)$$

$$= -j\omega A_{pp'}^{mn} - \frac{1}{j\omega} \Phi_{pp'}^{mn} - W_{pp'}^{mn} \cdot \delta_{mn} \cdot \delta_{mn} \text{ where}$$

$$A_{pp'}^{mn} = \langle B_p^m, L_{pp'}^A B_{p'}^n \rangle \qquad (8)$$

$$= \int_S B_p^m(\rho) \int_S B_{p'}^m(\rho') \cdot G^A(\rho - \rho', z_p, z_{p'}) \, d\rho' \, d\rho;$$

$$\Phi_{pp'}^{mn} = -\frac{1}{j\omega} \langle \nabla \cdot B_p^m, L_{pp'}^\phi \nabla' \cdot B_{p'}^n \rangle \qquad (9)$$

$$= -\frac{1}{j\omega} \int_S \nabla' \cdot B_{p'}^n(\rho) \int_S \nabla' \cdot B_{p'}^n(\rho') G^\phi(\rho - \rho', z_p, z_{p'}) \, d\rho' \, d\rho;$$

$$W_{pp'}^{mn} = \int_S Z_S B_p^m \cdot B_{p'}^n \, d\rho; m = 1, \ldots, N_p; n = 1, \ldots, N_{p'}; \qquad (10)$$

$\nabla \cdot B_i(r)$=scalar charge element corresponding to the current vector element $B_i(r)$;

$$-j\omega \int_S B_p^m(\rho) \int_S B_{p'}^n(\rho') \cdot G^A(\rho - \rho', z_p, z_{p'}) \cdot d\rho' \, d\rho =$$

voltage induced in the m-th current vector elements $B_p^m(\rho)$ located on plane $p$ due to the first *em* field;

$$\int_S G^A(\rho - \rho', z_p, z_{p'}) \cdot B_{p'}^n(\rho') d\rho' = \text{first } em \text{ field produced on plane } p$$

by the n-th current vector element $B_{p'}^n(\rho)$ located on plane $p'$;

$$\frac{1}{j\omega} \int_S \nabla \cdot B_p^m(\rho) \int_S \nabla' \cdot B_{p'}^n(\rho') G^\phi(\rho - \rho', z_p, z_{p'}) d\rho' \, d\rho =$$

voltage induced in the m-th scalar charge element $\nabla \cdot B_p^m(\rho)$ located on plane $p$ due to the second *em* field; and $$-\frac{1}{j\omega} \int_S G^\phi(\rho - \rho', z_p, z_{p'}) \nabla' \cdot B_{p'}^n(\rho') d\rho' = \text{second } em \text{ field produced by}$$

the n-th scalar charge element $\nabla \cdot B_{p'}^n(\rho')$ located on plane $p'$.

$A_{pp'}^{mn}$ and $\Phi_{pp'}^{mn}$ are operators of potentials A and $\phi$ on the p-th plane due to sources located on the p'-th plane. Only one component $G^A = G_{xx}^A = G_{yy}^A$ from a dyadic Green's function $\overline{G}^A$ is required since only x, y-directed currents exist.

Evaluation of the matrix-vector product $\overline{Z} \cdot I$ can be accelerated if the translational invariance $\rho - \rho'$ of the potentials A and $\phi$ is exploited. For this purpose, the RWG current vector elements, e.g., 56–66, (basis functions) B and their corresponding scalar charge elements, e.g., 56'–66', (divergences) ∇·B are projected on each rectangular grid, e.g., 72t, 72b, 74t, 74b, 76t and 76b.

In the following equation (11), for each current vector element (basis function) B and its corresponding scalar charge element (divergence) ∇·B, only M of K, where M<<K, point sources have non-zero amplitudes.

$$B_p^n(r) \to \sum_{k=0}^{K-1} \Lambda_{p,k}^n \delta(r-r_k'), \quad \nabla \cdot B_p^n(r) \to \sum_{k=0}^{K-1} \lambda_{p',k}^n \cdot \delta(r-r_k') \qquad (11)$$

where
- K=total number of nodes in a rectangular grid;
- k=0, . . . , K−1=index of a node in the rectangular grid;
- $B_p^n(r)$=n-th current vector element on a pair of mesh elements 50 located on the p-th plane;
- $\Lambda_{p,k}^n$=coefficients of projection of B (weights of the vector point sources 68) on a rectangular grid;
- $\nabla \cdot B_p^n(r)$=scalar charge element associated with the current vector element B(r) on a pair of mesh elements 50;
- $\lambda_{p,k}^n$=coefficients of projection of $\nabla B_p^n$ (values of the scalar point sources 68') on the p-th rectangular grid;
- $r_k$=locations of the vector point sources 68; and
- $\delta(r-r_k')$=so-called δ-function which is equal to zero for any $(r-r_k') \neq 0$ (this a mathematical abstraction often used for description of point sources).

Substituting equation (11) into equations (8) and (9), and using the filtering property of the δ-functions, the desired convolutional form of the matrix elements can be obtained as shown in the following equations (12) and (13).

$$-j\omega \hat{A}_{pp'}^{nm} = -j\omega \sum_{k=0}^{K-1} \Lambda_{p,k}^m \cdot \sum_{k'=0}^{K-1} G_{pp'}^A(\rho_k - \rho_{k'}, z_p z_{p'}') \Lambda_{p',k'}^n \qquad (12)$$
$$= -j\omega [\Lambda_p^m]^T \cdot [\Gamma_{pp'}^A] \cdot [\Lambda_{p'}^n]$$

$$\hat{\Phi}_{pp'}^{mn} = -\frac{1}{j\omega} \sum_{k=0}^{K-1} \lambda_{p,k}^m \cdot \sum_{k'=0}^{K-1} G^\varphi(\rho_k - \rho_{k'}, z_p, z_{p'}) \lambda_{p',k'}^n \qquad (13)$$
$$= -\frac{1}{j\omega} [\lambda_p^m]^T \cdot [\Gamma_{pp'}^\varphi] \cdot [\lambda_{p'}^n]$$

where
- $[G_{pp'}^A]=\{G_{pp'}^A(\rho_k-\rho_{k'}',z_p,z_{p'}'):k=0,\ldots,K-1\}$=first electromagnetic field at point $\rho_k$ in rectangular grid p produced by k'-th vector point source (dipole) located at $\rho_{k'}'$ on the rectangular grid p' (this is the Green's function well known in the field of electrical engineering);
- $[\Gamma_{pp'}^A]=\{G_{pp'}^A(\rho_k,z_p,z_{p'}'),k=1,\ldots,K-1\}$=matrix of the values of the Green's function at K points of the rectangular grid p under the condition the point source $\rho_{k'}'$ is located at the origin (k'=0) of the rectangular grid p', that is $\rho_0'=0$;
- $[\Lambda_{p'}^n]$=discrete current vector element on a rectangular grid corresponding to the n-th current vector element located on source plane p';
- $[\Lambda_p^m]$=discrete current vector element on the rectangular grid corresponding to the m-th current vector element located on the target plane p;
- $[G_{pp'}^A]\cdot[\Lambda_{p'}^n]$=the discretized first electromagnetic field induced in p-th rectangular target grid due to n-th discrete current vector element located on p'-th source rectangular grid;
- $-j\omega\hat{A}_{pp'}^{mn}=-j\psi[\Lambda_p^m]'\cdot[G_{pp'}^A]\cdot[\Lambda_{p'}^n]$=the vector produced in the m-th discrete current vector element by the first electromagnetic field induced in p-th target rectangular grid due to n-th discrete current vector element (associated with the current vector element) located on p'-th source rectangular grid;
- $[G_{pp'}^\Phi]=\{G_{pp'}^\Phi(\rho_k-\rho_{k'}',z_p,z_{p'}'):k=0,\ldots,K-1;k'=0,\ldots,K-1\}$=second electromagnetic field at point $\rho_k$ in rectangular grid p produced by k'-th scalar point source located at $\rho_{k'}'$ on the rectangular grid p'(this is the Green's function well known in the field of electrical engineering);
- $[\Gamma_{pp'}^A]=\{G_{pp'}^A(\rho_k,z_p,z_{p'}'):k=0,\ldots,K-1\}$=matrix of the values of the Green's function at K points of the rectangular grid p under condition the point source $\rho_k'$ is located at the origin (k'=0) of the rectangular grid p', that is $\rho_0'=0$;
- $[\lambda_{p'}^n]$=discrete scalar charge element on a rectangular grid corresponding to the n-th scalar charge element associated with an edge 52 located on the source plane p';
- $[\lambda_p^m]$=discrete scalar charge element on a rectangular grid corresponding to the m-th scalar charge element associated with an edge 52 located on the target plane p;
- $[G_{pp'}^\Phi]\cdot[\lambda_{p'}^n]$=the discretized second electromagnetic field induced in p-th target rectangular grid due to n-th discrete scalar charge element associated with an edge 52 located on p'-th source rectangular grid; and $$\hat{\Phi}_{pp'}^{mn} = -\frac{1}{j\omega}[\lambda_p^m]'\cdot[G_{pp'}^\Phi]\cdot[\lambda_{p'}^n] =$$

the voltage produced in the m-th scalar charge element by the second electromagnetic field induced in the p-th rectangular target grid due to n-th discrete scalar charge element associated with an edge 52 located on p'-th source rectangular grid.

In equations (12) and (13), the hat (ˆ) is utilized to distinguish the matrices computed through the projection of the current vector elements and the scalar charge elements on the rectangular grid.

Matrix-vector products $[G^A]\cdot[\Lambda^n]$ and $[G^\Phi]\cdot[\lambda^n]$ are 2-dimensional (2D) convolutions and can be evaluated utilizing fast Fourier transforms (FFT) shown in the following equations (14) and (15):

$$[G_{pp'}^A]\cdot[\Lambda_{p'}^n]=F^{-1}\{F\{[\Gamma_{pp'}^A]\}\cdot F\{[\Lambda_{p'}^n]\}\} \qquad (14)$$

$$[G_{pp'}^\Phi]\cdot[\lambda_{p'}^n]=F^{-1}\{F\{[\Gamma_{pp'}^\Phi]\}\cdot F\{[\lambda_{p'}^n]\}\} \qquad (15)$$

where
- $F\{[\Gamma_{pp'}^A]\}$=two-dimensional FFT (discrete spectrum) of the Green's function samples in rectangular grid p produced by point source located at the origin of the rectangular grid p';
- $F\{[\Lambda_{p'}^n]\}$=two-dimensional FFT (discrete spectrum) of each discrete current vector element on a rectangular grid corresponding to the n-th current vector element associated with an edge 52 located on source plane p';
- $F\{[\Gamma_{pp'}^\Phi]\}$=two-dimensional FFT (discrete spectrum) of the second electromagnetic field induced in rectangular grid p produced by discrete scalar point sources 68' located at the origin of rectangular grid p'; and $F\{[\lambda_p^n]\}$=two-dimensional FFT (discrete spectrum) of each discrete scalar charge element on a rectangular grid corresponding to the n-th scalar charge element associated with an edge 52 located on source plane p'.

The dot products in equations (14) and (15) denote the element-by-element multiplication of the matrices of the same dimensions. The result of this dot-product is a matrix of the same dimension as the two matrices subjected to the product.

As a result, the matrix-vector product evaluated using projections of the current vector elements (basis functions) $B_p^n$ and their corresponding scalar charge elements (divergences) $\nabla \cdot B_p^n$ on the rectangular grid takes on the form shown in the following equation (16):

$$\hat{V}_p^m = \sum_{p'=1}^{P} \sum_{n=1}^{N_{p'}} \hat{Z}_{pp'}^{mn} \cdot I_{p'}^n = \tag{16}$$

$$-j\omega [\Lambda_p^m]^T \cdot F^{-1}\left\{\sum_{p'=1}^{P} F\{[\Gamma_{pp'}^A]\} \cdot F\left\{\sum_{n=1}^{N_{p'}} [\Lambda_{p'}^n] \cdot I_{p'}^n\right\}\right\} +$$

$$\frac{1}{j\omega}[\lambda_p^m]^T \cdot F^{-1}\left\{\sum_{p'=1}^{P} F\{[\Gamma_{pp'}^\varphi]\} \cdot F\left\{\sum_{n=1}^{N_{p'}} [\lambda_{p'}^n] \cdot I_{p'}^n\right\}\right\} -$$

$$\sum_{p'=1}^{P} \sum_{n=1}^{N_{p'}} \delta_{mn}\delta_{pp'} W_{pp'}^{mn} \cdot I_{p'}^n$$

where
$F\{\ldots\}$ and $F^{-1}\{\ldots\}$ denote forward and inverse 2D FFT operations respectively;

$$F\left\{\sum_{n=1}^{N_{p'}} [\Lambda_{p'}^n] \cdot I_{p'}^n\right\} =$$

the current spectrum determined on the rectangular grid p' as the spectrum of the superposition of $N_{p'}$ current vector element projection matrices $[\Lambda_{p'}^n]$ with $I_{p'}^n$ defining the weights;

$$F\{[\Gamma_{pp'}^A]\} \cdot F\left\{\sum_{n=1}^{N_{p'}} [\Lambda_{p'}^n] \cdot I_{p'}^n\right\} =$$

the dot-product of the current spectrum $$F\left\{\sum_{n=1}^{N_{p'}} [\Lambda_{p'}^n] \cdot I_{p'}^n\right\}$$

at the source grid p' and Green's function spectrum $F\{[\Gamma_{pp'}^A]\}$ translating the first em field effect of the current to the target plane p;

$$\sum_{p'=1}^{P} F\{[\Gamma_{pp'}^A]\} \cdot F\left\{\sum_{n=1}^{N_{p'}} [\Lambda_{p'}^n] \cdot I_{p'}^n\right\} =$$

composite spectrum of the first induced vector field distribution matrices obtained as a summation of the spectrums of the first induced field distributions on the cell-by-cell basis;

$$F^{-1}\left\{\sum_{p'=1}^{P} F\{[\Gamma_{pp'}^A]\} \cdot F\left\{\sum_{n=1}^{N_{p'}} [\Lambda_{p'}^n] \cdot I_{p'}^n\right\}\right\} =$$

the actual vector induced field matrix on plane p obtained as the inverse Fourier transform of the composite spectrum (this is the combined first EM fields induced in that plane by the source plane currents $$\sum_{n=1}^{N_{p'}} [\Lambda_{p'}^n] \cdot I_{p'}^n,$$

p'=1, ..., P;

$$-j\omega[\Lambda_p^m]^T \cdot F^{-1}\left\{\sum_{p'=1}^{P} F\{[\Gamma_{pp'}^A]\} \cdot F\left\{\sum_{n=1}^{N_{p'}} [\Lambda_{p'}^n] \cdot I_{p'}^n\right\}\right\} =$$

voltage produced in the m-th current vector element of plane p represented by matrix $[\Lambda_p^m]$ due to the combined first em fields induced in that plane by all the currents $$\sum_{n=1}^{N_{p'}} [\Lambda_{p'}^n] \cdot I_{p'}^n$$

on planes p' from 1 through P;

$$F\left\{\sum_{n=1}^{N_{p'}} [\lambda_{p'}^n] \cdot I_{p'}^n\right\} =$$

the charge spectrum determined on the rectangular grid p' as the spectrum of the superposition of $N_{p'}$ discrete scalar charge element projection matrices $[\lambda_{p'}^n]$ with $I_{p'}^n$ defining the weights;

$$F\{[\Gamma_{pp'}^\phi]\} \cdot F\left\{\sum_{n=1}^{N_{p'}} [\lambda_{p'}^n] \cdot I_{p'}^n\right\} =$$

dot-product of the charge spectrum $$F\left\{\sum_{n=1}^{N_{p'}}[\lambda_{p'}^n]\cdot I_{p'}^n\right\}$$

on the source grid p' and Green's function spectrum $F\{[\Gamma_{pp'}^\phi]\}$ translating the second em field effects of the charges to the target plane p;

$$\sum_{p'=1}^{P} F\{[\Gamma_{pp'}^\phi]\} \cdot F\left\{\sum_{n=1}^{N_{p'}}[\lambda_{p'}^n]\cdot I_{p'}^n\right\} =$$

composite spectrum of the second induced scalar field distribution matrices obtained as a summation of the spectrums of the second induced field distributions on the cell-by-cell basis;

$$-\frac{1}{j\omega}F^{-1}\left\{\sum_{p'=1}^{P} F\{[\Gamma_{pp'}^\phi]\} \cdot F\left\{\sum_{n=1}^{N_{p'}}[\lambda_{p'}^n]\cdot I_{p'}^n\right\}\right\} =$$

the actual scalar induced field matrix on plane p obtained from the inverse Fourier transform of the composite spectrum (this is the combined second em fields induced in that plane by the source plane currents $$\sum_{n=1}^{N_{p'}}[\lambda_{p'}^n]\cdot I_{p'}^n, \ p'=1,\ldots,P);$$

$$+\frac{1}{j\omega}[\Lambda_p^m]^T \cdot F^{-1}\left\{\sum_{p'=1}^{P} F\{[\Gamma_{pp'}^A]\} \cdot F\{[\lambda_{p'}^n]\cdot I_{p'}\}\right\} =$$

voltage produced in m-th discrete scalar charge element of plane p represented by matrix $[\lambda_p^n]$ to the combined second em fields induced in that plane by the source plane charges or $$\sum_{n=1}^{N_{p'}}[\lambda_{p'}^n]\cdot I_{p'}^n, \ p'=1,\ldots,P;$$

$$\begin{aligned}&-j\omega[\Lambda_p^m]^T\cdot F^{-1}\left\{\sum_{p'=1}^{P} F\{[\Gamma_{pp'}^A]\}\cdot F\left(\sum_{n=1}^{N_{p'}}[\Lambda_{p'}^n]\cdot I_{p'}^n\right)\right\}\\&+\frac{1}{j\omega}[\Lambda_p^m]^T\cdot F^{-1}\left\{\sum_{p'=1}^{P} F\{[\Gamma_{pp'}^\phi]\}\cdot F\left(\sum_{n=1}^{N_{p'}}[\lambda_{p'}^n]\cdot I_{p'}^n\right)\right\}\end{aligned} =$$

superposition of the voltage induced in the m-th discrete current vector element due to the first em field (a current field) and in the m-th discrete scalar charge element due to the second em field (a charge field); and $$\sum_{p'=1}^{P}\sum_{n=1}^{N_{p'}}\delta_{pp'}\delta_{mn}W_{pp'}^{mn}\cdot I_p^n =$$

the voltage drops in the m-th current vector element associated with the finite ohmic conductivity of the conductors.

The point source representations in equation (11) provide an accurate approximation of the matrix elements $A_{pp'}^{mn}$ and $\psi_{pp'}^{mn}$ only when the n-th source current vector element (basis function) $B_p^n$ is situated sufficiently far from the m-th current vector element (testing function) $B_p^m$. Therefore, precorrection of the contributions into matrix-vector product (16) from the closely located basis and testing functions is required.

In the following equation (17), partial matrix-vector products $$\sum_{p'=1}^{P} Z_{pp'}^{near}\cdot I_{p'}$$

are evaluated directly as it is done in the conventional MoM.

$$V_p = V_p^{near} + (\hat{V}_p - \hat{V}_p^{near}) = \sum_{p'=1}^{P}\left[Z_{pp'}^{near} + (\hat{Z}_{pp'} - \hat{Z}_{pp'}^{near})\right]\cdot I_{p'} \quad (17)$$

where
Z=em impedance matrix;
$Z_{pp'}$=the submatrix of em impedance matrix Z corresponding to the interactions between planes p and p';
$\hat{Z}$=the form of the em impedance matrix obtained as a result of the discretization of the current and charge carrying elements on the rectangular grids;
$\hat{Z}_{pp'}$=the submatrix of em impedance matrix $\hat{Z}$ corresponding to the interactions between planes p and p';

$$Z_{pp'}^{near} =$$

the matrix of near interactions computed in a way well-known in the art of electrical engineering. The element $$Z_{pp',mn}^{near}$$

of the matrix $$Z_{pp'}^{near}$$

corresponds to correct partial voltage induced in element m located on p-th plane due to em field produced by n-th element located on p'-th plane. The distance between the centers of these elements is smaller than a certain threshold;

$$\hat{Z}_{pp'}^{near} =$$

the matrix of near interactions computed using the projections of the current vector elements and scalar charge elements on the rectangular grids. The element $$\hat{Z}_{pp',mn}^{near}$$

of the matrix $$\hat{Z}_{pp'}^{near}$$

corresponds to the erroneous partial voltage induced in the discretized form of the element pair m located on p-th plane due to the em field produced by the discretized form of the n-th element located on p'-th plane. The distance between the centers of these mesh element pairs is smaller than a certain threshold;

$$Z_{pp'}^{near} \cdot I_{p'} + (\hat{Z}_{pp'} \cdot I_{p'} - \hat{Z}_{pp'}^{near} \cdot I_{p'}) =$$

the compensation for the erroneous near field interactions between planes p and p' in the matrix-vector product $\hat{Z}_{pp'} \cdot I_{p'}$; and $$\sum_{p'=1}^{P} Z_{pp'}^{near} \cdot I_{p'} + (\hat{Z}_{pp'} \cdot I_{p'} - \hat{Z}_{pp'}^{near} \cdot I_{p'}) =$$

the vector of total (plane-wise) pre-corrected voltages induced in the elements of plane p due to the currents on the planes p'=1, . . . , P.

Equation 17 corresponds to the equation AV=V2+(V1−V3) described above.

The foregoing algorithms can be summarized as follows:
Compute the projection from the current vector elements and corresponding scalar charge elements (basis functions on triangle pairs) to a 2-dimensional rectangular grid for each plane, that is, transform the given current distribution on the basis functions to a two-dimensional rectangular grid for each plane;
Compute the Fourier transforms of the current and charge distributions on each 2-dimensional rectangular grid and the equivalent first and second spectrums, respectively, through Green's functions for each source plane;
Compute the summation of the first spectrum for a given observation plane;
Compute the inverse Fourier transform of the summation of the first spectrum;
Compute the summation of the second spectrum for a given observation plane;
Compute the inverse Fourier transform of the summation for the second spectrum;
Interpolate back to the current vector and scalar charge elements (basis functions) on triangles; and
Compute the matrix-vector product for near-field interactions directly.

FIG. 10 is a flow chart of the foregoing steps.

As can be seen, the present invention is a method for determining voltages induced on each layer of a multi-layer circuit due to current flowing in conductors in the various layers of the circuit and in vias connecting conductors in pairs of adjacent layers of the circuit. At the expense of some accuracy, the present invention enables the voltages induced on the various layers of the circuit due to current flowing in conductors on the various layers and in vias extending between adjacent layers to be determined in a more computational efficient manner than prior art techniques. Because of the computationally efficiency accorded by the present invention, the voltages induced on each layer of a multi-layer circuit due to current flowing in said layer and in other layers of the circuit is capable of being determined. This is a vast improvement over the prior art wherein due to computational complexity, the voltages induced in one layer of a multi-layer circuit due to current flowing in the other layers of the multi-layer circuit could not be determined efficiently.

The present invention has been described with reference to the preferred embodiment. Obvious modifications and alterations will occur to others upon reading and understanding the preceding detailed description. It is intended that the present invention be construed as including all such modifications and alterations insofar as they come within the scope of the appended claims or the equivalents thereof.

The invention claimed is:

1. A method of determining a distribution of voltages or currents in a plurality of layers of a multi-layer circuit design in response to energization of the circuit design with an exemplary bias, the method comprising:
   (a) discretizing an exemplary current that flows in each layer of a multi-layer circuit design in response to an application of an exemplary bias to the circuit design into a plurality of currant vector elements on said layer;
   (b) determining for each current vector element on each layer at least one corresponding scalar charge element on said layer;
   (c) determining for each layer from the current vector elements on the plurality of layers, a spectrum of a first electromagnetic (em) field induced in the layer;
   (d) determining a first distribution of voltages induced in each layer from the spectrum of the first electromagnetic (em) field induced in said layer;
   (e) determining for each layer from the scalar charge elements on the plurality of layers, a spectrum of a second em field induced in the layer;
   (f) determining a second distribution of voltages induced in each circuit layer from the spectrum of the second em field induced in said layer; and
   (g) determining for each layer from the first and second distributions of voltages induced in the layer, a distribution of voltages in the layer.

2. The method of claim 1, wherein step (c) includes:
   determining a current spectrum for each layer from the plurality of current vector elements on said layer;
   determining for each pair of layers, a distribution of a first em field induced in one of said pair of layers (target layer) in response to an effect of at least one current vector element on the other of said pair of layers (source layer), wherein each layer acting as both the target layer and the source layer comprises one of said pair of layers;

determining for each first em field distribution, a corresponding first em field spectrum;

for each instance where each layer is the target layer of a pair of layers, combining the current spectrum determined for said layer with the first em field spectrum determined for said instance of said layer to obtain a spectrum of an induced vector field distribution matrix for said instance of said layer; and for instances where each layer is the target layer of a pair of layers, combining the spectrums of the induced vector field distribution matrices associated with said instances to obtain the spectrum of the first cm field induced in said layer.

3. The method of claim 1, wherein step (e) includes:

determining a charge spectrum for each layer from the plurality of scalar charges on said layer;

determining for each pair of layers, a distribution of a second em field induced in one of said pair of layers (target layer) in response to an effect of at least one scalar charge element on the other of said pair of layers (source layer), wherein each layer acting as both the target layer and the source layer comprises one of said pair of layers;

determining for each second em field distribution, a corresponding second em field spectrum;

for each instance where each layer is the target layer of a pair of layers, combining the charge spectrum determined for said layer with the second em field spectrum determined for said instance of said layer to obtain a spectrum of an induced scalar field distribution matrix for said instance of said layer; and for instances where each layer is the target layer of a pair of layers, combining the spectrums of the induced sealer field distribution matrices associated with said instances to obtain the spectrum of the second em field induced in said layer.

4. The method of claim 1, further including:

discretizing each layer into a plurality of discrete layers; and performing steps (a)–(g) for each discrete layer.

5. A method of determining a distribution of voltages or currents in a multi-layer circuit design in response to energization of the circuit design wit an exemplary bias, the method comprising:

(a) defining top and bottom layers for each conductor in each level of a multi-layer circuit design;

(b) discretizing an exemplary current that flows in each layer in response to an application of an exemplary bias to the circuit design into a plurality of current vector elements on said layer;

(c) determining for each current vector element on each layer, at least one scalar charge element on said layer related to a derivative of said current vector element;

(d) determining a current spectrum for each layer from the current vector elements on said layer;

(e) determining for each pair of layers, a distribution of a first electromagnetic (em) field induced in the one of said pair of layers (target layer) due to an effect of at least one current vector element in the other of said pair of layers (source layer), wherein the pairs of layers include:

each layer acting as both the target layer and the source layer; and each layer acting as the target layer for each other layer, one-at-a-time, acting as the source layer;

(f) determining a first em field spectrum for each instance of the first em field distribution;

(g) for each instance where each layer is the target layer of a pair of layers, combining the current spectrum determined for said layer in step (d) with the first em field spectrum determined for said instance of said layer in step (f) to obtain a spectrum of an induced vector field distribution matrix;

(h) for instances where each layer is the target layer of a pair of layers, combining the spectrums of the induced vector field distribution matrices associated with said instances to obtain for said layer, a corresponding composite spectrum of induced vector field distribution matrices;

(i) determining from the composite spectrum of induced vector field distribution matrices for each layer, a corresponding actual vector induced field matrix;

(j) determining a first distribution of voltages in each layer from the actual vector induced field matrix for said layer;

(k) determining a charge spectrum for each layer from scalar charge elements determined on said layer;

(l) determining for each pair of layers, a distribution of a second electromagnetic (em) field induced in one of said pair of layers (target layer) due to an effect of at least one scalar charge element in the other of said pair of layers (source layer), wherein the pairs of layers include:

each layer acting as both the target layer and the source layer; and each layer acting as the target layer for each other layer, one-at-a-time, acting as the source layer;

(m) determining a second em field spectrum for each instance of the second em field distribution;

(n) for each instance where each layer is the target layer of a pair of layers, combining the charge spectrum determined for said layer in step (k) with the second em field spectrum determined for said instance of said layer in step (m) to obtain a spectrum of an induced scalar field distribution matrix;

(o) far instances where each layer is the target layer of a pair of layers, combining the spectrums of the induced scalar field distribution matrices associated with said instances to obtain for said layer, a corresponding composite spectrum of induced scalar field distribution matrices;

(p) determining from the composite spectrum of induced scalar field distribution matrices for each layer, a corresponding actual scalar induced field matrix;

(q) determining a second distribution of voltages in each layer from the actual scalar induced field matrix for said layer; and (r) combining corresponding voltages of the first and second distribution of voltages determined for each layer to obtain a new distribution of voltages in said layer.

6. The method of claim 5, wherein step (d) includes:

determining for each current vector element on each layer, at least one vector point source on said layer, wherein each vector point source comprises a magnitude; and determining a Fourier transform of magnitudes of the vector paint sources on each discrete layer to obtain the current spectrum for said layer.

7. The method of claim 5, wherein step (f) includes determining a Fourier transform of each instance of the first em field distribution to obtain the corresponding first em field spectrum.

8. The method of claim 5, wherein step (g) includes determining a dot product of the current spectrum determined for said layer in step (d) times the first em field spectrum determined for said instance of said layer in step (f) to obtain the spectrum of the induced vector field distribution matrix for said instance of said layer.

9. The method of claim 5, wherein step (h) includes summing the spectrums of the induced vector field distribution matrices associated with said instances to obtain the corresponding composite spectrum of induced vector field distribution matrices.

10. The method of claim 5, wherein step (i) includes determining an inverse Fourier transform of the composite spectrum of induced vector field distribution matrices for each layer to obtain the actual vector induced field matrix for said layer.

11. The method of claim 5, wherein step (k) includes:
determining for each scalar charge element on each layer, at least one scalar point source of said layer, wherein each scalar point source comprises a magnitude; and
determining a Fourier transform of the magnitude of the at least one scalar point source on each layer to obtain the charge spectrum for said layer.

12. The method of claim 5, wherein step (m) includes determining a Fourier transform of each instance of second em field distribution to obtain a corresponding second em field spectrum.

13. The method of claim 5, wherein step (n) includes determining a dot product of the charge spectrum determined for said layer in step (k) times the second em field spectrum determined far said instance of said layer in step (m) to obtain the spectrum of the induced scalar field distribution matrix for said instance of said layer.

14. The method of claim 5, wherein step (o) includes summing the spectrums of the induced scalar field distribution matrices associated with said instances to obtain the corresponding composite spectrum of induced scalar field distribution matrices.

15. The method of claim 5, wherein step (p) includes determining an inverse Fourier transform of the composite spectrum of induced scalar field distribution matrices for each layer to obtain the actual scalar induced field matrix for said layer.

16. The method of claim 5, wherein, for each via that electrically connects conductors on adjacent layers of the multi-layer circuit design, the method further includes, prior to step (c):
determining a first portion of a current vector element on a first layer related to a current entering the via;
combining the first portion of the current vector element with at least one current vector element on the first layer determined under an assumption that the via does not exist to obtain a first resultant current vector element related to the current entering the via;
substituting the first resultant current vector element for the current vector element determined for the first layer under the assumption that the via does not exist;
determining a second portion of the current vector element on a second, adjacent layer related to a current exiting the via;
combining the second portion of the current vector element with at least one current vector element on the second layer determined under the assumption that the via does not exist to obtain a second resultant current vector element related to the current exiting the via; and
substituting the second resultant current vector element for the current vector element determined for the second layer under the assumption that the via does not exist.

17. The method of claim 5, wherein, for each via that electrically connects conductors on adjacent layers of the multi-layer circuit design, the method further includes, prior to step (c):
determining a first portion of a scalar charge element on a first layer related to a current entering the via;
combining the first portion of the scalar charge element with at least one scalar charge element on the first layer determined under an assumption that the via does not exist, to obtain a first resultant scalar charge element related to the current entering the via;
substituting the first resultant scalar charge element for the scalar charge element determined for the first layer under the assumption that the via does not exist;
determining a second portion of the scalar charge element on a second, adjacent layer related to a current exiting the via;
combining the second portion of the scalar charge element with at least one scalar charge element on the second layer determined under the assumption that the via does not exist to obtain a second resultant scalar charge element related to the current exiting the via; and
substituting the second resultant scalar charge clement for the scalar charge element determined for the second layer under the assumption that the via does not exist.

18. The method of claim 5, wherein:
each current vector element is comprised of a vector sum of an x-current vector element and a y-current vector element;
steps (d)–(i) are performed separately for x-current vector elements and y-current vector elements; and
step (i) further includes combining the actual vector induced field matrix determined for the x-current vector elements of each layer with the actual vector induced field matrix determined for the y-current vector elements of said layer, on a cell-by-cell basis, to obtain the actual vector induced field matrix that is utilized in step (j) to determine the first distribution of voltages in said layer.

19. A computer aided method of determining a distribution of voltages or currents in conductors of a multi-layer circuit design in response to application of a bias to said circuit design, the method comprising:
(a) defining top and bottom layers for each conductor in each level of a multi-layer circuit design;
(b) discretizing a conductive portion of each layer into a plurality of mesh elements, with adjacent mesh elements in each layer defining an edge therebetween, with adjacent layers of the same conductor having edges of their respective mesh elements in alignment;
(c) discretizing a flow of an exemplary current through each mesh element into at least one current vector element;
(d) determining for each current vector element, at least one scalar charge element related to a derivative of the current vector element;
(e) defining a rectangular grid for each layer, with rectangular grids having a same spatial relationship as corresponding layers and being identical to each other;
(f) discretizing current vector elements of each layer on a corresponding rectangular grid;

(g) determining a current spectrum for each rectangular grid from the discretized current vector elements on said rectangular grid;

(h) determining for each pair of rectangular grids, a first electromagnetic (em) field induced in one of said pair of rectangular grids (target grid) due to at least one discretized current vector element in the other of said pair of rectangular grids (source grid), wherein the pairs of rectangular grids include each rectangular grid acting as both the target grid and the source grid, and each rectangular grid acting as the target grid for each other rectangular grid acting as the source grid;

(i) determining a first em field spectrum for each instance of the first em field;

(j) for each instance of each rectangular grid acting as the target grid of a pair of grids, combining the current spectrum determined for said rectangular grid in step (g) with the first em field spectrum determined for said instance of said rectangular grid in step (i) to obtain a spectrum of an induced vector field distribution matrix;

(k) combining the spectrums of the induced vector field distribution matrices associated with the instances of each rectangular grid acting as the target grid of a pair of grids to obtain a composite spectrum of the induced vector field distribution matrices for said rectangular grid;

(l) determining an actual vector induced field matrix for each rectangular grid from the composite spectrum of the induced vector field distribution matrices for said rectangular grid;

(m) determining a voltage that is induced where each current vector element resides on each rectangular grid from the actual vector induced field matrix for said rectangular grid;

(n) discretizing scalar charge elements of each layer on a corresponding rectangular grid;

(o) determining a charge spectrum for each rectangular grid from the discretized scalar charge elements on said rectangular grid;

(p) determining for each pair of rectangular grids, a second em field induced in one of said pair of rectangular grids (target grid) due to at least one discretized scalar charge element in the other of said pair of rectangular grids (source grid), wherein the pairs of rectangular grids include each rectangular grid acting as both the target grid and the source grid, and each rectangular grid acting as the target grid for each other rectangular grid acting as the source grid;

(q) determining a second em field spectrum for each instance of the second em field;

(r) for each instance of each rectangular grid acting as the target grid of a pair of grids, combining the charge spectrum determined for said rectangular grid in step (o) with the second em field spectrum determined for said instance of said rectangular grid in step (q) to obtain a spectrum of an induced scalar field distribution matrix;

(s) combining the spectrums of the induced scalar field distribution matrices associated with the instances of each rectangular grid acting as the target grid of a pair of grids to obtain a composite spectrum of the induced scalar field distribution matrices for said rectangular grid;

(t) determining an actual scalar induced field matrix for each rectangular grid from the composite spectrum of the induced scalar field distribution matrices for said rectangular grid;

(u) determining a voltage that is induced where each scalar charge element resides on each rectangular grid from the actual scalar induced field matrix for said rectangular grid; and (v) combining the voltage determined for each current vector element in step (m) with the voltage determined for the corresponding scalar charge element in step (u) to obtain a first voltage that has been induced on the edge of the mesh element that resides at the corresponding location on the rectangular grid due to em effects of the exemplary current flowing in each mesh element.

20. The method of claim 19, wherein at least one of:

step (g) includes determining a Fourier transform of to discretized current vector elements on each rectangular grid to obtain the current spectrum for said rectangular grid;

step (i) includes determining a Fourier transform of each first em field to obtain the first em field spectrum;

the combining in step (j) includes determining a dot product of the current spectrum for said rectangular grid times the first em field spectrum for said instance of said rectangular grid;

the combining in step (k) includes summing, on a cell-by-cell basis, the spectrums of the induced vector field distribution matrices associated with the instances of each rectangular grid acting as the target grid of a pair of grids, to obtain for said rectangular grid, the composite spectrum of the induced vector field distribution matrices;

step (l) includes determining an inverse Fourier transform of the composite spectrum of the induced vector field distribution matrices determined for each rectangular grid, to obtain the actual vector induced field matrix for said rectangular grid;

step (o) includes determining a Fourier transform of the discretized scalar charge elements on each rectangular grid to obtain the charge spectrum for said rectangular grid;

step (q) includes determining a Fourier transform of each second em field to obtain the second em field spectrum;

the combining in step (r) includes determining a dot product of the charge spectrum for said rectangular grid times the second em field spectrum for said instance of said rectangular grid;

the combining in step (s) includes summing, on a cell-by-cell basis, the spectrums of the induced scalar vector field distribution matrices associated with the instances of each rectangular grid acting as the target grid of a pair of grids to obtain for said rectangular grid, the composite spectrum of the induced scalar field distribution matrices; and step (t) includes determining an inverse Fourier transform of the composite spectrum of the induced scalar field distribution matrices determined for each rectangular grid, to obtain the actual scalar induced field matrix for said rectangular grid.

21. The method of claim 19, wherein:

each mesh element is a triangular mesh element; and step (c) includes discretizing the flow of the exemplary current through each triangular mesh element into a current vector element that flows through at least one edge of the triangular mesh element.

22. The method of claim 19, wherein, for each via that electrically connects conductors on adjacent layers of the multi-layer circuit design, the method further includes, prior to step (d):

decomposing a current vector element entering a first end of the via and exiting a second end of the via into first and second portions, respectively;

combining the first portion of the current vector element with a current vector element associated with the first end of the via, wherein a latter current vector element is determined under an assumption that the via does not exist, to obtain a first resultant current vector element related to a current entering the via;

substituting the first resultant current vector element related to the current entering the via for the current vector element associated with the first end of the via that was determined under the assumption that the via does not exist;

combining the second portion of the current vector element with the current vector element associated with a second end of the via , wherein a latter current vector element is determined under the assumption that the via does not exist, to obtain a second resultant current vector element related to a current exiting the via; and substituting the second resultant current vector element related to the current exiting the via for the current vector element associated with the second end of the via that was determined under the assumption that the via does not exist.

23. The method of claim 22, wherein the current entering the via is the same as the current exiting the via.

24. The method of claim 19, wherein:

each current vector element is comprised of a vector sum of an x-oriented vector element and a y-oriented vector element;

steps (f)–(m) are performed separately for x-oriented vector elements and y-oriented vector elements; and step (m) further includes determining the vector sum of the x-oriented vector element and y-oriented current vector element of each current vector element to obtain the voltage that is induced where the current vector element resides on the rectangular grid.

25. The method of claim 19, further including:

determining for each mesh element pair sharing an edge through which a current vector element flows (target mesh element pair), a voltage induced at said edge due to current vector elements, and scalar charge elements residing on edges of each other mesh element pair (source mesh element pair) within a first predetermined distance of the target mesh element pair;

for each target mesh element pair, summing voltages induced at the edge of the target mesh element pair due to current vector elements and scalar charge elements on the edges of source mesh element pairs within the first predetermined distance of the target mesh element pair to obtain a second voltage that has been induced therein;

determining for each point on each rectangular grid where each discretized scalar charge element and each discretized current vector element reside, a voltage induced at said point due to discretized scalar charge elements and discretized current vector elements within a second predetermined distance of said point;

summing voltages induced at the discretized scalar charge elements and discretized current vector elements associated with the edge of each target mesh element pair to obtain a third voltage that has been induced therein; and combining the first, second and third voltages determined for the edge of each target mesh element pair to obtain an actual voltage induced thereat.

26. The method of claim 25, wherein the actual voltage for the edge of each target mesh element pair equals a sum of the first and second voltages for the edge of the target mesh element pair minus the third voltage for the edge of the target mesh element pair.

27. A computer readable medium having stored thereon instructions which, when executed by a processor, cause the processor to:

(a) discretize an exemplary current that flows in each layer of a multi-layer circuit design in response to an application of an exemplary bias to the circuit design into a plurality of current vector elements on said circuit layer;

(b) determine for each current vector element on each layer at least one corresponding scalar charge element on said layer;

(c) determine for each layer from the current vector elements on the plurality of layers a spectrum of a first electromagnetic (em) field induced in the layer;

(d) determine a first distribution of voltages induced in each layer from the spectrum of the first electromagnetic (em) field induced in said layer;

(e) determine for each layer from scalar charge elements on the plurality of layers, a spectrum of a second em field induced in the layer;

(f) determine a second distribution of voltages induced in each layer from the spectrum of the second em field induced in said layer; and (g) determine for each layer from the first and second distributions of voltages induced in the layer, an actual distribution of voltages in the layer.

28. The computer readable medium of claim 27, wherein, in step (c), the instructions further cause the processor to:

determine a current spectrum for each layer from the plurality of current vector elements on said layer;

determine for each pair of layers, a distribution of a first em field induced in one of said pair of layers (target layer) in response to an effect of at least one current vector element on the other of said pair of layers (source layer), wherein each layer acting as both the target layer and the source layer comprises one of said pair of layers;

determine for each first em field distribution, a corresponding first em field spectrum;

for each instance where each layer is the target layer of a pair of layers, combine the current spectrum determined for said layer with the first em field spectrum determined for said instance of said layer to obtain a spectrum of an induced vector field distribution matrix for said instance of said layer; and for instances where each layer is the target layer of a pair of layers, combine spectrum of the induced vector field distribution matrices associated with said instances to obtain a spectrum of the first em field induced in said layer.

29. The computer readable medium of claim 27, wherein, in step (e), the instructions further cause the processor to:

determine a charge spectrum for each layer from the plurality of scalar charges on said layer;

determine for each pair of layers, a distribution of a second em field induced in one of said pair of layers (target layer) in response to an effect of at least one scalar charge element on the other of said pair of layers (source layer), wherein each layer acting as both the target layer and the source layer comprises one of said pair of layers;

determine for each second em field distribution, a corresponding second em field spectrum;

for each instance where each layer is the target layer of a pair of layers, combine the charge spectrum determined for said layer with the second em field spectrum determined for said instance of said layer to obtain a spectrum of an induced scalar field distribution matrix for said instance of said layer; and for instances where each layer is the target layer of a pair of layers, combine spectrums of the induced scalar field distribution matrices associated with said instances to obtain a spectrum of the second em field induced in said layer.

30. The computer readable medium of claim 27, wherein the instructions further cause the processor to:
discretize each layer into a plurality of discrete layers; and
perform steps (a)–(g) for each discrete layer.

31. A computer readable medium having stored thereon instructions which, when executed by a processor, cause the processor to:
(a) define top and bottom layers for each conductor in each level of a multi-layer circuit design;
(b) discretize an exemplary current that flows in each layer in response to an application of an exemplary bias to the circuit design into a plurality of current vector elements on said layer;
(c) determine for each current vector element on each layer, at least one scalar charge element on said layer related to a derivative of said current vector element;
(d) determine a current spectrum for each layer from the current vector elements on said layer;
(e) determine for each pair of layers, a distribution of a first electromagnetic (em) field induced in the one of said pair of layers (target layer) due to an effect of at least one current vector element in the other of said pair of layers (source layer), wherein the pairs of layers include:
each layer acting as both the target layer and the source layer; and
each layer acting as the target layer for each other layer, one-at-a-time, acting as the source layer;
(f) determine a first em field spectrum for each instance of the first em field distribution;
(g) for each instance where each layer is the target layer of a pair of layers, combine the current spectrum determined for said layer in step (d) with the first em field spectrum determined for said instance of said layer in step (f) to obtain a spectrum of an induced vector field distribution matrix;
(h) for instances where each layer is the target layer of a pair of layers, combine spectrums of the induced vector field distribution matrices associated with said instances to obtain for said layer a corresponding composite spectrum of induced vector field distribution matrices;
(i) determine from the composite spectrum of induced vector field distribution matrices for each layer, a corresponding actual vector induced field matrix;
(j) determine a first distribution of voltages in each layer from the actual vector induced field matrix for said layer;
(k) determine a charge spectrum for each layer from scalar charges on said layer;
(l) determine for each pair of discrete layers, a distribution of a second electromagnetic (em) field induced in one of said pair of layers (target layer) due to an effect of at least one scalar charge element in the other of said pair of layers (source layer), wherein the pairs of layers include:
each layer acting as both the target layer and the source layer; and
each layer acting as the target layer for each other layer, one-at-a-time, acting as the source layer;
(m) determine a second em field spectrum for each instance of the second em field distribution;
(n) for each instance where each layer is the target layer of a pair of layers, combine the charge spectrum determined for said layer in step (k) with the second em field spectrum determined for said instance of said layer in step (m) to obtain a spectrum of an induced scalar field distribution matrix;
(o) for instances where each layer is the target layer of a pair of layers, combine spectrums of the induced scalar field distribution matrices associated with said instances to obtain for said layer a corresponding composite spectrum of induced scalar field distribution matrices;
(p) determine from the composite spectrum of induced scalar field distribution matrices for each layer, a corresponding actual scalar induced field matrix;
(q) determine a second distribution of voltages in each layer from the actual scalar induced field matrix for said layer; and
(r) combine corresponding voltages of the first and second distribution of voltages determined for each layer to obtain a new distribution of voltages in said layer.

32. The computer readable medium of claim 31, wherein, for each via that electrically connects conductors on adjacent layers of the multi-layer circuit design, the instructions further cause the processor to, prior to step (c):
determine a first portion of a current vector element on a first layer related to a current entering the via;
combine the first portion of the current vector element with at least one current vector element on the first layer determined under an assumption that the via does not exist to obtain a first resultant current vector element related to the current entering the via;
substitute the first resultant current vector element for the current vector element determined for the first layer under the assumption that the via does not exist;
determine a second portion of a current vector element on a second layer related to the current exiting the via;
combine the second portion of the current vector element with at least one current vector element on the second, adjacent layer determined under the assumption that the via does not exist to obtain a second resultant current vector element related to the current exiting the via; and
substitute the second resultant current vector element for the current vector element determined for the second layer under the assumption that the via does not exist.

33. A computer readable medium having stored thereon instructions which, when executed by a processor, cause the processor to:
(a) define discrete top and bottom layers for each conductor in each level of a multi-layer circuit design;
(b) discretize a conductive portion of each layer into a plurality of mesh elements, with adjacent mesh elements in each layer defining an edge therebetween, with adjacent layers of a same conductor having edges of their respective mesh elements in alignment;
(c) discretize a flow of an exemplary current through each mesh element into at least one current vector element;

(d) determining for each current vector element, at least one scalar charge element related to a derivative of the current vector element;

(e) define a rectangular grid for each layer, with rectangular grids having a same spatial relationship as corresponding layers and being identical to each other;

(f) discretize current vector elements of each layer on a corresponding rectangular grid;

(g) determine a current spectrum far each rectangular grid from the discretized current vector elements on said rectangular grid;

(h) determine for each pair of rectangular grids, a first electromagnetic (em) field induced in one of said pair of rectangular grids (target grid) due to at least one discretized current vector element in the other of said pair of rectangular grids (source grid), wherein pairs of rectangular grids include each rectangular grid acting as both the target grid and the source grid, and each rectangular grid acting as the target grid for each other rectangular grid acting as the source grid;

(i) determine a first em field spectrum for each instance of the first em field;

(j) for each instance of each rectangular grid acting as the target grid of a pair of grids, combine the current spectrum determined for said rectangular grid in step (g) with the first em field spectrum determined for said instance of said rectangular grid in step (i) to obtain a spectrum of an induced vector field distribution matrix;

(k) combine spectrums of the induced vector field distribution matrices associated with the instances of each rectangular grid acting as the target grid of a pair of grids to obtain a composite spectrum of the induced vector field distribution matrices for said rectangular grid;

(l) determine an actual vector induced field matrix for each rectangular grid from the composite spectrum of the induced vector field distribution matrices for said rectangular grid;

(m) determine a voltage that is induced where each current vector element resides on each rectangular grid from the actual vector induced field matrix for said rectangular grid;

(n) discretize scalar charge elements of each layer on a corresponding rectangular grid;

(o) determine a charge spectrum for each rectangular grid from the discretized charge elements on said rectangular grid;

(p) determine for each pair of rectangular grids, a second em field induced in one of said pair of rectangular grids (target grid) due to at least one discretized scalar charge element in the other of said pair of rectangular grids (source grid), wherein pairs of rectangular grids include each rectangular grid acting as both the target grid and the source grid, and each rectangular grid acting as the target grid for each other rectangular grid acting as the source grid;

(q) determine a second em field spectrum for each instance of the second em field;

(r) for each instance of each rectangular grid acting as the target grid of a pair of grids, combine the charge spectrum determined for said rectangular grid in step (o) with the second em field spectrum determined for said instance of said rectangular grid in step (q) to obtain a spectrum of an induced scalar field distribution matrix;

(s) combine spectrums of the induced scalar field distribution matrices associated with the instances of each rectangular grid acting as the target grid of a pair of grids to obtain a composite spectrum of the induced scalar field distribution matrices for said rectangular grid;

(t) determine an actual scalar induced field matrix for each rectangular grid from the composite spectrum of the induced scalar field distribution matrices for said rectangular grid;

(u) determine a voltage that is induced where each scalar charge element resides on each rectangular grid from the actual scalar induced field matrix for said rectangular grid; and (v) combine the voltage determined for each current vector element in step (m) with the voltage determined for the corresponding scalar charge element in step (u) to obtain a first voltage that has been induced at the edge of the mesh element that resides at a corresponding location on the rectangular grid due to em effects of the exemplary current flow in each mesh element.

34. The computer readable medium of claim 33, wherein the instructions further cause the processor to perform at least one of the following steps:

determine a Fourier transform of the discretized current vectors on each rectangular grid to obtain the current spectrum for said rectangular grid in step (g);

determine a Fourier transform of each first em field to obtain the first em field spectrum in step (i);

determine a dot product of the current spectrum for each rectangular grid times the first em field spectrum for said instance of each rectangular grid in step (j);

sum, on a cell-by-cell basis, the spectrums of the induced vector field distribution matrices associated with the instances of each rectangular grid acting as the target grid of a pair of grids, to obtain for said rectangular grid, the composite spectrum of the induced vector field distribution matrices in step (k);

determine an inverse Fourier transform of the composite spectrum of the induced vector field distribution matrices determined for each rectangular grid, to obtain the actual vector induced field matrix for said rectangular grid in step (l);

determine a Fourier transform of the discretized scalar point charge elements on each rectangular grid to obtain the charge spectrum for said rectangular grid in step (o);

determine a Fourier transform of each second em field to obtain the second em field spectrum in step (q);

determine a dot product of the charge spectrum for each rectangular grid times the second em field spectrum for said instance of each rectangular grid in step (r);

sum, on a cell-by-cell basis, the spectrums of the induced scalar vector field distribution matrices associated with the instances of each rectangular grid acting as the target grid of a pair of grids to obtain for said rectangular grid, the composite spectrum of the induced scalar field distribution matrices in step (s); and determine an inverse Fourier transform of the composite spectrum of the induced scalar field distribution matrices for each rectangular grid, to obtain the actual scalar induced field matrix for said rectangular grid in stop (t).

35. The computer readable medium of claim 33, wherein, for each via that electrically connects conductive layers on adjacent layers of the multi-layer circuit design, the instructions further cause the processor to, prior to step (d):

decompose a current vector element entering a first end of the via and exiting a second end of the via into first and second portions, respectively;

combine the first portion of the current vector element with a current vector element associated with the first end of the via, wherein a latter current vector element is determined under an assumption that the via does not exist, to obtain a first resultant current vector element related to a current entering the via;

substitute the first resultant current vector element related to the current entering the via for the current vector element associated with the first end of the via that was determined under the assumption that the via does not exist;

combine to second portion of the current vector element with the current vector element associated with the second end of the via, wherein a latter current vector element is determined under the assumption that the via does not exist, to obtain a second resultant current vector element related to a current exiting the via; and substitute the second resultant current vector element related to the current exiting the via for the current vector element associated with the second end of the via that was determined under the assumption that the via does not exist.

36. The computer readable medium of claim 33, wherein, for each via that electrically connects conductive layers on adjacent layers of the multi-layer circuit design, the instructions further cause the processor to, prior to step (d):

decompose a scalar charge element entering a first end of the via and exiting a second end of the via into first and second portions, respectively;

combine the first portion of the scalar charge element with a scalar charge element associated with the first end of the via, wherein a latter scalar charge element is determined under an assumption that the via does not exist, to obtain a first resultant scalar charge element related to a current entering the via;

substitute the first resultant scalar charge element related to the current entering the via for the scalar charge element associated with the first end of the via that was determined under the assumption that the via does not exist;

combine the second portion of the scalar charge element with the scalar charge element associated with the second end of the via, wherein a latter scalar charge element is determined under the assumption that the via does not exist, to obtain a second resultant scalar charge element related to a current exiting the via; and substitute the second resultant scalar charge element related to the current exiting the via for the scalar charge element associated with the second end of the via that was determined under the assumption that the via does not exist.

37. The computer readable medium of claim 33, wherein the instructions further cause the processor to:

determine for each mesh element pair sharing an edge through which a current vector flows (target mesh element pair), a voltage induced at said edge due to current vector elements and scalar charge elements residing in each other mesh element pair (source mesh element pair) within a first predetermined distance of the target mesh element;

for each target mesh element pair, sum voltages induced at the edge of the target mesh element pair due to current vector elements and scalar charge elements on edges of source mesh element pairs within the first predetermined distance of the target mesh element pair to obtain a second voltage that has been induced therein;

determine for each point on each rectangular grid where each discretized scalar charge element and each discretized current vector element resides, the voltage induced at said point due to discretized scalar charge elements and discretized current vector elements within a second predetermined distance of said point;

sum the voltages induced at the discretized scalar charge elements and the discretized current vector elements associated with the edge of each target mesh element to obtain a third voltage that has been induced therein; and combine the first, second and third voltages determined for the edge of each target mesh element pair to obtain an actual voltage induced thereat.

38. The computer readable medium of claim 37, wherein the actual voltage for the edge of each target mesh element pair equals the sum of the first and second voltages for the edge of the target mesh element pair minus the third voltage for the edge of the target mesh element pair.

* * * * *